(12) United States Patent
Mineno

(10) Patent No.: US 8,280,840 B2
(45) Date of Patent: Oct. 2, 2012

(54) DATA INTEGRATION APPARATUS, DATA INTEGRATION METHOD, AND COMPUTER PRODUCT

(75) Inventor: Kazuo Mineno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 516 days.

(21) Appl. No.: 12/174,246

(22) Filed: Jul. 16, 2008

(65) Prior Publication Data

US 2008/0281849 A1    Nov. 13, 2008

Related U.S. Application Data

(63) Continuation of application No. PCT/JP2006/300652, filed on Jan. 18, 2006.

(51) Int. Cl.
*G06F 17/30* (2006.01)

(52) U.S. Cl. .......... 707/602; 707/760; 707/810

(58) Field of Classification Search .......... 707/602, 707/810, 760
See application file for complete search history.

(56) References Cited

U.S. PATENT DOCUMENTS

| | | | |
|---|---|---|---|
| 6,694,306 B1 | 2/2004 | Nishizawa et al. | |
| 6,820,088 B1 * | 11/2004 | Hind et al. | 1/1 |
| 6,954,748 B2 * | 10/2005 | Dettinger et al. | 707/774 |
| 7,152,074 B2 * | 12/2006 | Dettinger et al. | 707/810 |
| 2003/0167274 A1 * | 9/2003 | Dettinger et al. | 707/100 |
| 2003/0172056 A1 * | 9/2003 | Dettinger et al. | 707/3 |
| 2004/0034651 A1 * | 2/2004 | Gupta et al. | 707/102 |
| 2005/0050068 A1 | 3/2005 | Vaschillo et al. | |

FOREIGN PATENT DOCUMENTS

| | | |
|---|---|---|
| JP | 8-179980 | 7/1996 |
| JP | A 2001-101065 | 4/2001 |
| JP | A 2001-109758 | 4/2001 |
| JP | A 2005-208757 | 8/2005 |
| JP | A 2005-293047 | 10/2005 |
| JP | 2005-327232 | 11/2005 |

OTHER PUBLICATIONS

Partial English translation of Notice of Rejection issued by the Japanese Patent Office in Japanese Application No. 2007-554771, issued May 9, 2011.
Decision of Rejection issued by the Japanese Patent Office in Japanese App. No. 2011-175352, mailed Aug. 14, 2012.

* cited by examiner

*Primary Examiner* — Rehana Perveen
*Assistant Examiner* — Albert Phillips, III
(74) *Attorney, Agent, or Firm* — Greer, Burns & Crain, Ltd.

(57) ABSTRACT

When collecting and integrating data present in separately managed information sources, data are collected from the information sources through a physical model of the information sources. Integration is executed by a process of converting a data configuration (mapping) into a logical model predefined for each utilization-side application and a process of converting and conforming values (cleansing); and the result thereof is provided as a view (logical model) for each application to the utilization-side application.

10 Claims, 21 Drawing Sheets

[MAPPING DEFINITION OF TABLE E]

| | From_COLUMN | To_COLUMN | SOLVED-FLAG |
|---|---|---|---|
| (1) | TABLE A. EMPLOYEE NUMBER | TABLE E. EMPLOYEE NUMBER | 1 |
| (2) | TABLE B. EMPLOYEE NUMBER | TABLE E. EMPLOYEE NUMBER | 1 |
| (3) | TABLE B. POSITION | TABLE D. POSITION | 1 |
| (4) | TABLE A. NAME | TABLE E. NAME | 1 |
| (5) | TABLE D. NAME | TABLE E. POSITION | 0 |
| (6) | TABLE D. POSITION | TABLE D. NAME | 0 |

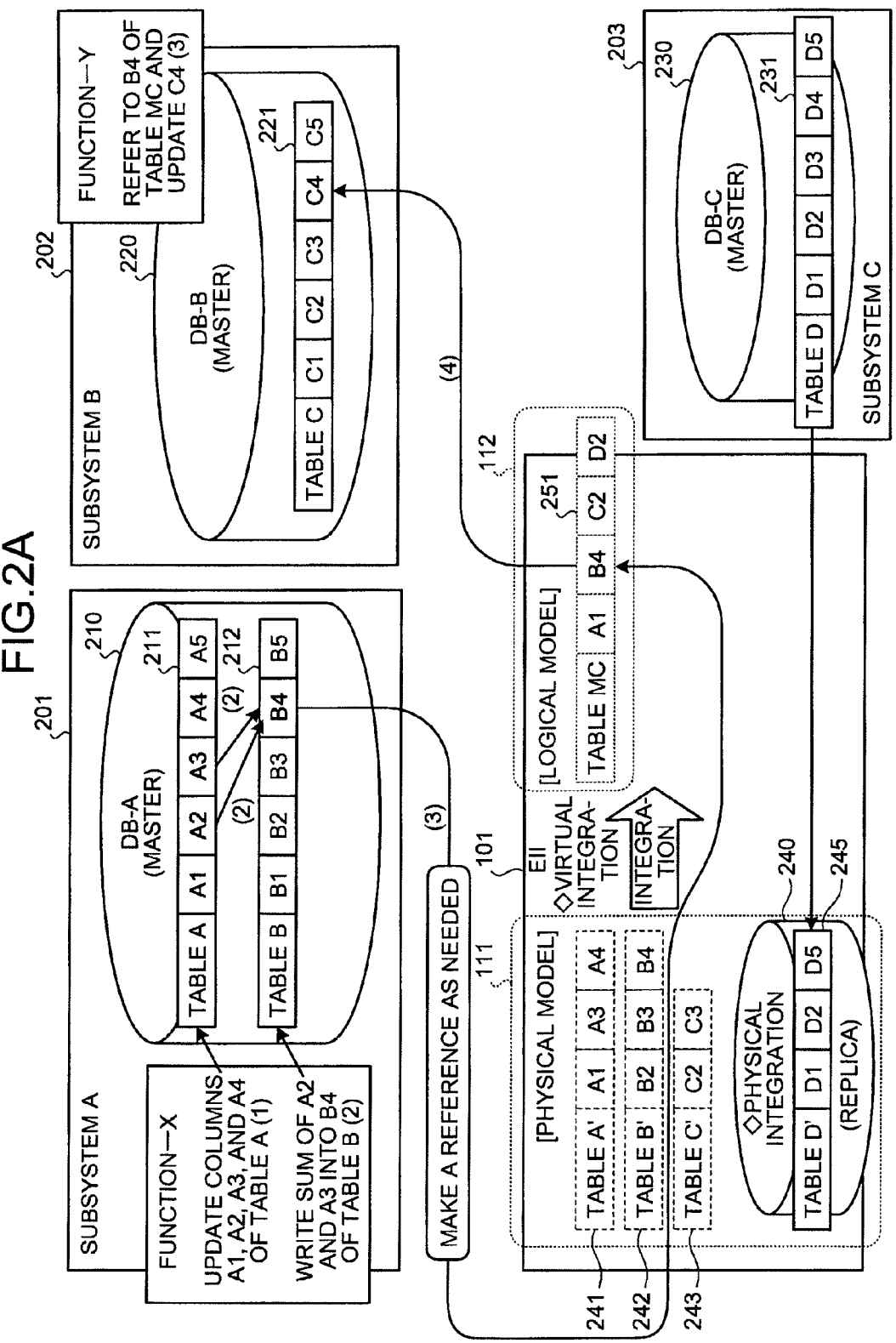

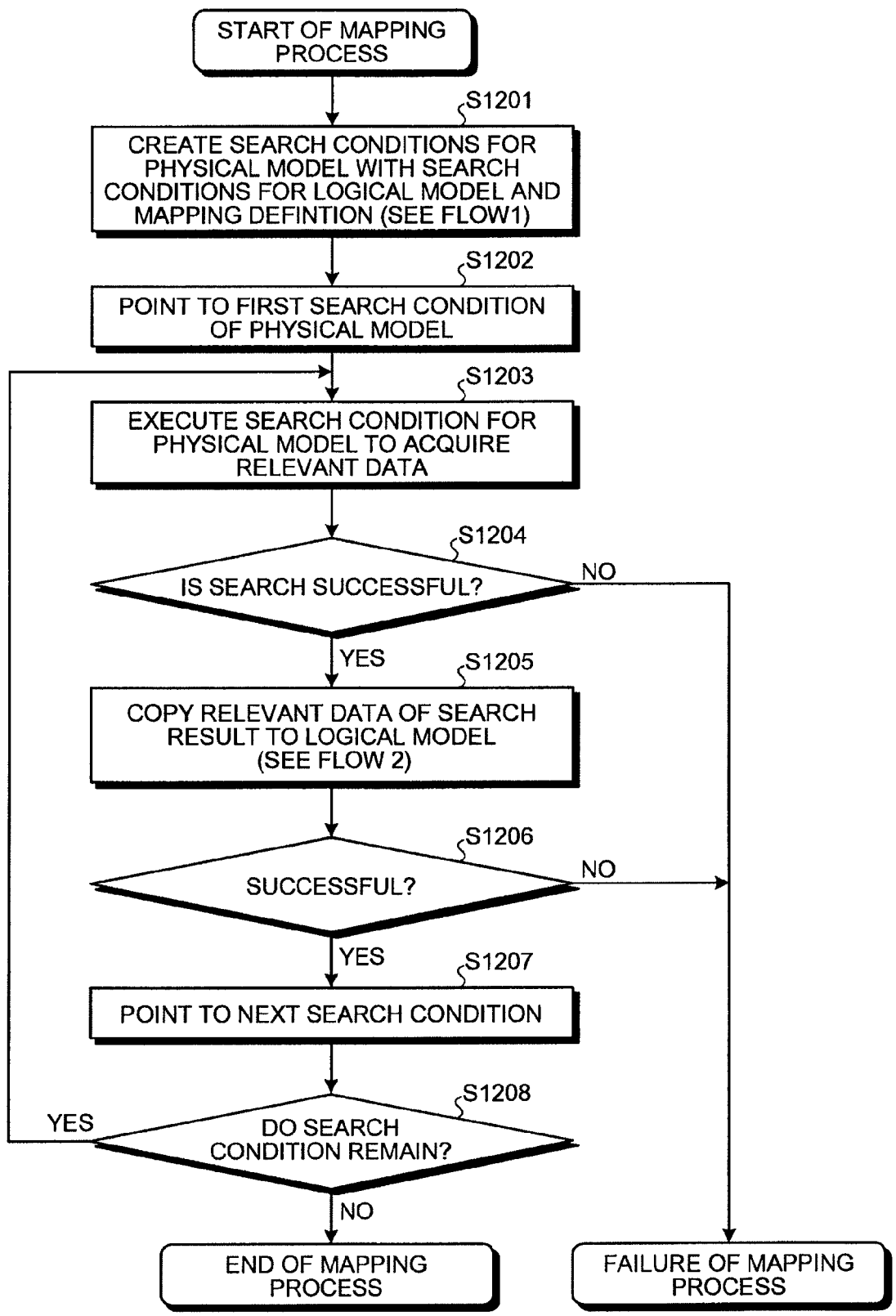

FIG.13

[MAPPING DEFINITION OF TABLE E]

|     | From COLUMN        | To COLUMN          | POINT |
|-----|--------------------|--------------------|-------|
| (1) | A. EMPLOYEE_NUMBER | E. EMPLOYEE_NUMBER | 22    |
| (2) | B. EMPLOYEE_NUMBER | E. EMPLOYEE_NUMBER | 22    |
| (3) | B. POSITION        | D. POSITION        | 11    |
| (4) | A. NAME            | E. NAME            | 0     |
| (5) | D. NAME            | E. POSITION        | 0     |
| (6) | D. POSITION        | D. NAME            | 0     |

FIG.14

☐ From COLUMN CONSTRAINT (MKey) → 20POINTS
☐ From COLUMN CONSTRAINT (SKey) → 10POINTS
☐ From COLUMN CONSTRAINT (NONE) → 0POINT
☐ To   COLUMN CONSTRAINT (MKey) → 2POINT
☐ To   COLUMN CONSTRAINT (MKey) → 1POINT
☐ To   COLUMN CONSTRAINT (NONE) → 0POINT

FIG.16

[SEARCH STATEMENT]
- Select * From E Where EMPLOYEE_NUMBER =7500

SEARCH TARGET   E. EMPLOYEE_NUMBER
SEARCH CONDITION 7500

FIG.18

[MAPPING DEFINITION OF TABLE E]

|     | From_COLUMN | To_COLUMN | SOLVED-FLAG |
| --- | --- | --- | --- |
| (1) | TABLE A. EMPLOYEE NUMBER | TABLE E. EMPLOYEE NUMBER | 1 |
| (2) | TABLE B. EMPLOYEE NUMBER | TABLE E. EMPLOYEE NUMBER | 1 |
| (3) | TABLE B. POSITION | TABLE D. POSITION | 1 |
| (4) | TABLE A. NAME | TABLE E. NAME | 1 |
| (5) | TABLE D. NAME | TABLE E. POSITION | 0 |
| (6) | TABLE D. POSITION | TABLE D. NAME | 0 |

FIG.19

- Select * From A Where EMPLOYEE_NUMBER =7500
- Select * From B Where EMPLOYEE_NUMBER =7500

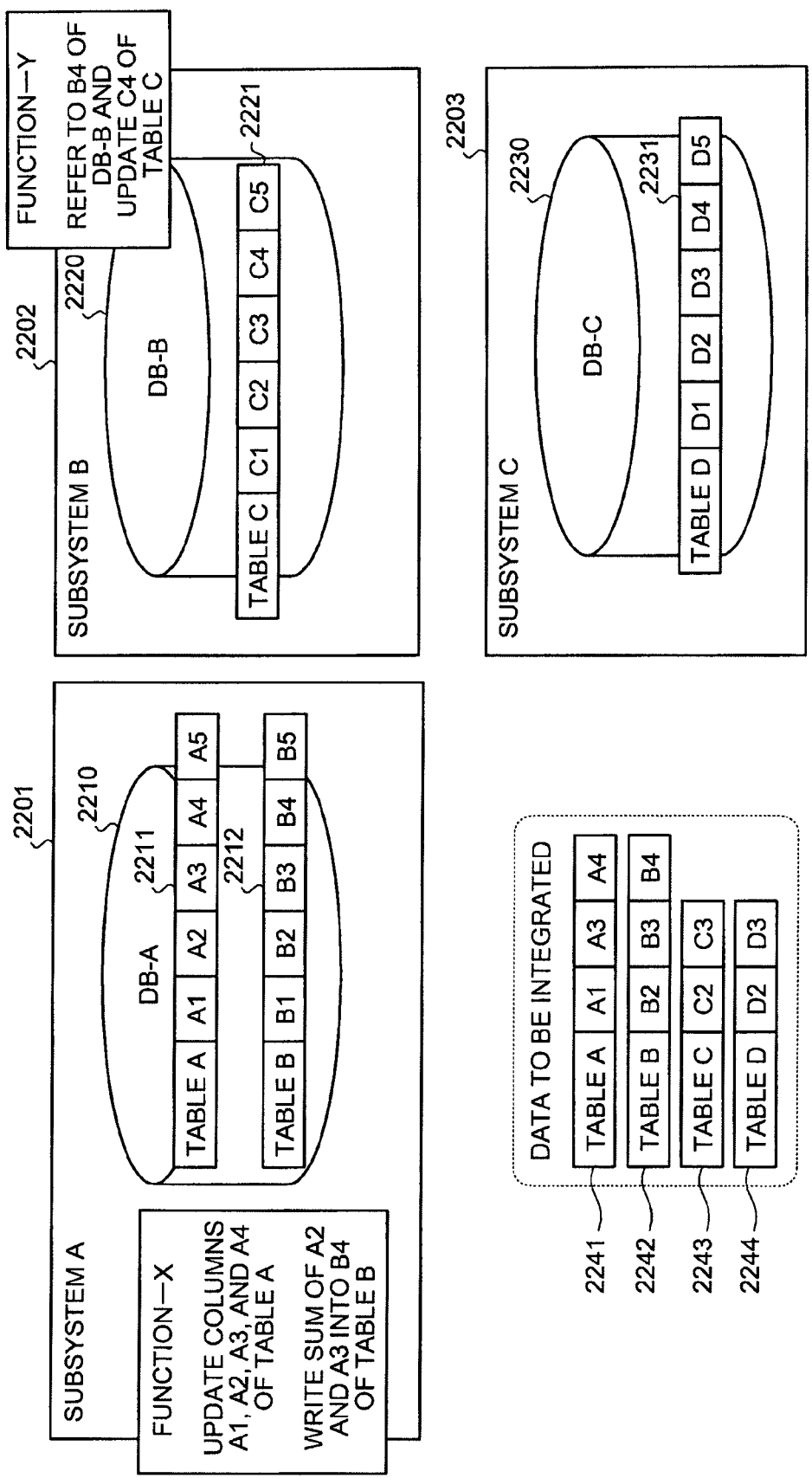

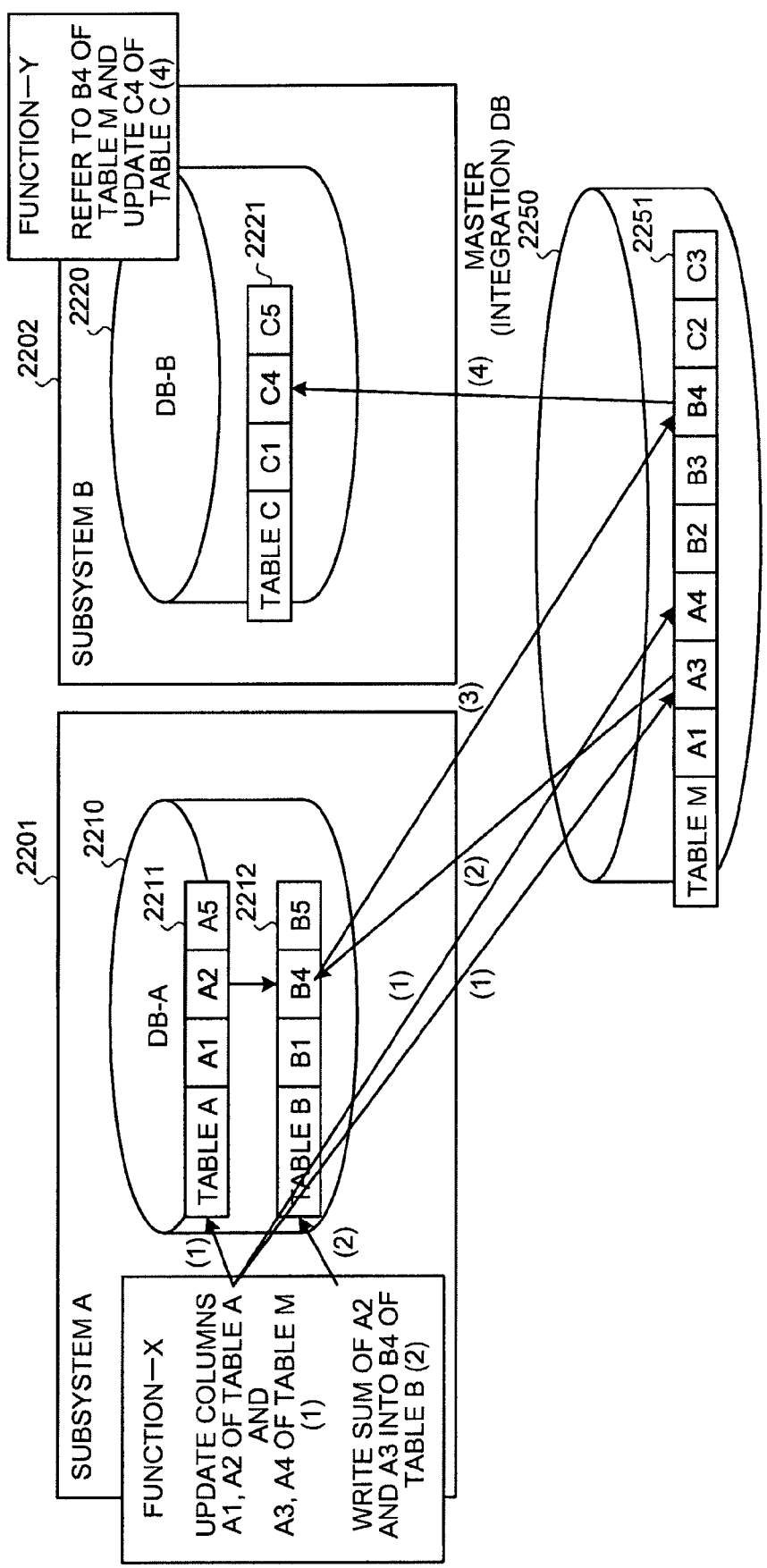

DATA INTEGRATION APPARATUS, DATA INTEGRATION METHOD, AND COMPUTER PRODUCT

This application is a Continuation Application of International Application No. PCT/JP2006/300652, filed Jan. 18, 2006.

BACKGROUND OF THE INVENTION

1. Field of the Invention

The present invention relates to collection and integration of data in plural information sources managed in different systems.

2. Description of the Related Art

An apparatus has been realized conventionally that integrates data managed in different systems to coordinate the systems. For example, Extract/Transform/Load (ETL) is implemented by extracting data from a database serving as an information source, transforming the data into a form easily utilized in a utilization-side system, and loading the data into a database of the utilization system, and is normally developed and operated in batch processing according to each purpose. A typical application of ETL is for the establishment of a data warehouse.

In Enterprise Application Integration (EAI), organic coordination of plural computer systems is implemented by coordinating data and processes in accordance with predetermined criteria among coordinated systems.

In a specific example of EAI, a predetermined standard data format is prescribed to implement coordination between plural business systems designed to use different data formats, and when data coordination is performed between the business systems, data of the transfer-source business system are temporarily converted into the standard data format and further converted into the data format of the transfer-destination business system to thereby implement the data coordination between the systems (see, for example, Japanese Patent Application Laid-Open Publication No. 2005-293047).

In the disclosed technology, the format of data from one business system is converted into the standard data format, or vice versa, to perform data coordination with the use of dictionary databases having stored therein correlation information between data formats used in data processing by business systems and the standard data format. In this method, the standard data format must be defined to establish a dedicated conversion dictionary database for each information system, and if a change is made in the standard data format, all the dictionary databases must be changed. At the time of actual coordination, the data format conversion process is performed and CPU processing is executed in at least two steps.

Therefore, data integration called Enterprise Information Integration (EII) is desired. EII is a scheme of integrating and utilizing physically scattered data on a single view.

On the other hand, Master Data Management (MDM) is a scheme of integrating and managing master data distributed among plural systems. FIGS. 22 and 23 depict the principle of MDM according to a conventional technology. FIG. 22 is a schematic of states of subsystems before introducing the MDM, and FIG. 23 is a schematic of an exemplary implementation of the MDM according to a conventional technology.

In FIG. 22, reference numerals 2201, 2202, and 2203 denote subsystems A, B, and C, respectively, to be integrated. The subsystem A 2201 includes a database A (DB-A) 2210 having a table A 2211 and a table B 2212; the subsystem B 2202 includes a database B (DB-B) 2220 having a table C 2221; and the subsystem C 2203 includes a database C (DB-C) 2230 having a table D 2231. Each table has columns. For example, the table A 2211 has columns A1, A2, A3, A4, and A5.

Reference numerals 2241, 2242, 2243, and 2244 denote data items that are the targets of integration among the data in the tables of the DBs managed in the subsystems. For example, in the case of the table A 2211, columns "A1", "A3", and "A4" are the targets of integration. The subsystem A 2201 includes a function-X, which is a representative example of a function included in a data integration target system before the data integration is applied, and the subsystem B 2202 includes a function-Y, which is a representative example of an application function utilizing the data integration.

FIG. 23 depicts an exemplary implementation of the MDM with the subsystem A 2201 and the subsystem B 2202 of FIG. 22 integrated according to a conventional technology. First, a master (integration) DB 2250 is created and, configured to collect the data sequences 2241, 2242, 2243 from tables (original tables) of the DB managed in the subsystems and to include a master table M 2251. Although the data sequences collected into the master table M 2251 are deleted from the original tables to avoid overlapping management whenever possible since the data sequences collected into the master table M 2251 are the master data in this case, the integration target data may not completely be deleted from the original tables.

For example, since the data sequences serving as a primary key of the original table cannot be deleted, some data may be managed by both the original table and the master table M 2251. Applications implementing functions of the subsystems are changed to handle not only the original tables but also the master table M 2251. Each table is shown, for example, the table A 2211 includes "A1", "A2", and "A5" as columns.

Specifically, the shared information ("A1", "A3", "A4", "B2", "B3", "B4", "C2", and "C3") is centrally managed as the master table M 2251 by the master DB 2250. The information specific to the systems ("A2", "A5", "B1", "B5", "C1", "C4", and "C5") is managed by the systems. The DBs of the systems also include information overlapping with the master DB 2250 (e.g., "A1", "B4").

The operations of the function-X and the function-Y are explained. First, the function-X of the subsystem A 2201 is executed, which is "update columns A1 and A2 of table A, A3 and A4 of table M (1)". Therefore, the subsystem A 2201 updates "A1", "A3", and "A4" of the master table M 2251 of the master DB 2250 and updates "A1" and "A2" of the table A 2211 managed by the DB-A 2210.

Next, "write sum of A2 and A3 into B4 of table B (2)" of function-X is executed. Therefore, the subsystem A 2201 acquires "A3" in the master table M 2251 of the master DB 2250 and writes the sum of "A2" in the table A 2211 and the acquired "A3" into "B4" of the table B 2212. The update of "B4" is reflected in the master DB 2250 (3).

The function-Y of the subsystem B 2202 is then executed, which is "refer to B4 of table M and update C4 (4)". Therefore, the subsystem B 2202 refers to "B4" of the master DB 2250 reflecting the update at (3) above and updates "C4" of table C 2221. Data integration using the master DB 2250 is performed as described above.

However, the conventional system has the following problem in that since the master DB 2250 is necessary, the application of the utilization-side system must consciously manage the location of information as well as reference and update the information not only in the table managed by its system but also in the master DB 2250. Therefore, this leads to the need to upgrade the application causing the contents of the application to become complicated.

When updating information, the application must perform control to synchronize and update the information in its own system and the information in the master DB 2250 without inconsistency. In this control, it is problematic in that transactions must be controlled for the system and the master DB 2250 to implement a process such as rollback by the application when a process has failed, leading to increased burden on the application.

The data of the utilization-side system referred to at the time of update or the data to be updated may be in a partially processed state (state when values are not determined because another application is operating) in some cases, and this must be prevented by some kind of lock control for data subject to update. This is also problematic in that the overall performance of the system is reduced by performing the lock control across the subsystems. For example, when the subsystem A 2201 locks the master table M 2251 (integration DB), another system cannot utilize the integration DB and, therefore, the other system must wait for the completion of the process (transaction) of the subsystem A 2201.

A change in the subsystem may cause an addition to or a change in data item managed by the integration DB, and on this occasion, in many cases, the application must be changed for all the subsystems using the table of the integration DB where the change occurs. Since an addition to the data item managed by the integration DB is generated according to the individual subsystems, the integration DB tends to be bloated as a result.

Since centralization to the integration DB and the bloating of the integration DB occur and the access to the integration DB is increased, there is a problem in that the performance deteriorates in terms of referencing/updating the integration DB, the applications become complicated, and the integration DB affects each of the subsystems.

SUMMARY OF THE INVENTION

It is an object of the present invention to at least solve the above problems in the conventional technologies.

A data integration apparatus according to one aspect of the present invention collects and integrates data in plural information sources managed in different systems, and includes a data collecting unit 114 that directly collects, from each of the information sources, the data as a physical model of each of the information sources; a data integration engine 110 that converts at least one of a data configuration and a data value such that the data collected by the data collecting unit are formed into a logical model preliminarily defined for each utilization-side application utilizing the data; and a data providing unit 115 that provides the data converted by the data integration engine to the utilization-side application.

A data integration method according to another aspect of the present invention is of an apparatus collecting and integrating data in plural information sources managed in different systems and includes collecting directly from each of the information sources, the data as a physical model of each of the information sources; converting at least one of a data configuration and a data value such that the data collected at the data collecting are formed into a logical model preliminarily defined for each utilization-side application utilizing the data; and providing the data converted at the data converting to the utilization-side application.

A computer-readable recording medium according to still another aspect of the present invention stores therein a data integration program for collecting and integrating data in plural information sources managed in different systems and that causes a computer to execute collecting directly from each of the information sources, the data as a physical model of each of the information sources; converting at least one of a data configuration and a data value such that the data collected at the data collecting are formed into a logical model preliminarily defined for each utilization-side application utilizing the data; and providing the data converted at the data converting to the utilization-side application.

The other objects, features, and advantages of the present invention are specifically set forth in or will become apparent from the following detailed description of the invention when read in conjunction with the accompanying drawings.

BRIEF DESCRIPTION OF THE DRAWINGS

FIGS. 2A and 2B are explanatory views of the principle of the EII;

FIG. 12 is a flowchart detailing a mapping process;

FIG. 13 is a schematic of an example of a mapping definition;

FIG. 14 is a schematic of an example of evaluation points;

FIG. 16 is a schematic of an example of a search statement (include search condition) issued from a utilization-side application;

FIG. 18 is a schematic of an example of the mapping definition;

FIG. 19 is an example of the search statements created;

FIG. 22 is a schematic of states of subsystems before introducing MDM; and

FIG. 23 is a schematic of an exemplary implementation of the MDM according to a conventional technology.

DETAILED DESCRIPTION OF THE PREFERRED EMBODIMENTS

Referring to the accompanying drawings, exemplary embodiments according to the present invention are explained in detail below.

Figure 1:
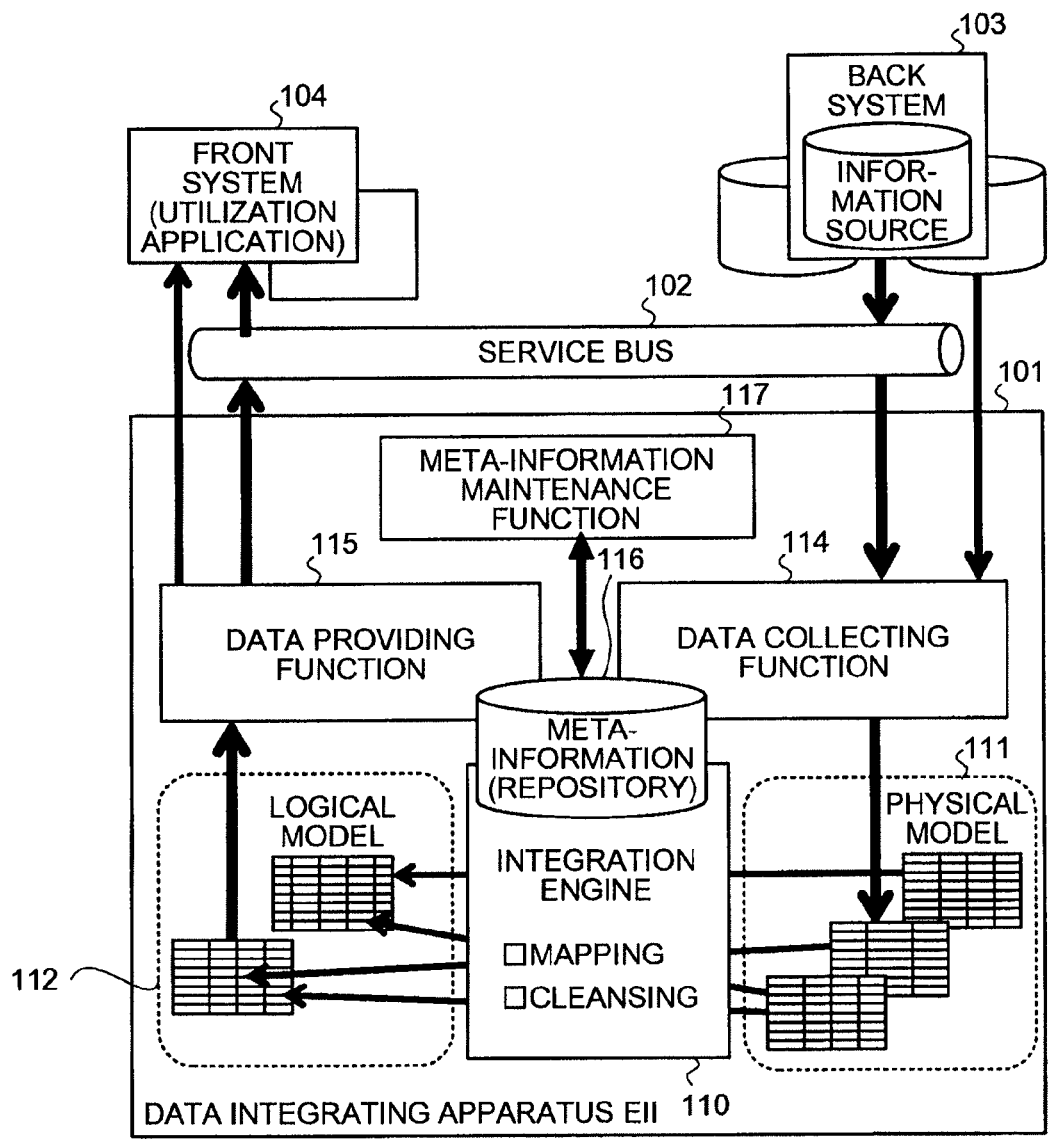
FIG. 1 is an explanatory view of an overall configuration of EII according to the present invention.

FIG. 1 is an explanatory view of an overall configuration of EII according to the present invention. In FIG. 1, denotes a data integration apparatus (hereinafter, "EII") 101 includes an integration engine 110 and a meta-information repository function consisting of a physical model 111 and a logical model 112. The EII 101 is connected directly or through a service bus 102 to back systems (information sources) 103 and a front system (a utilization application) 104.

The EII 101 includes the integration engine 110, which executes a data configuration conversion process (mapping) from the physical model 111 to the logical model 112 and a data value conversion process (cleansing). The EII 101 also includes meta-information (repository) 116 defining names of tables, names of data items (columns), and types of data, capable of defining type attributes defining details of types for the types of data, and capable of defining a data item constraint such as a primary key constraint and a Foreign Key constraint. The meta-information is maintained by a meta-information maintenance function 117. Improvement in the certainty and effectiveness of the mapping and the cleansing can be achieved by the meta-information maintenance.

The functions can be implemented by executing programs recorded in a memory such as RAM and ROM not shown with a CPU in a computer system making up the EII 101. With regard to each of the databases (DBs) described in the embodiment, the function can be implemented by data recorded in a data recording medium such as hard discs (not shown) and database management software in each computer system.

Figure 2B:
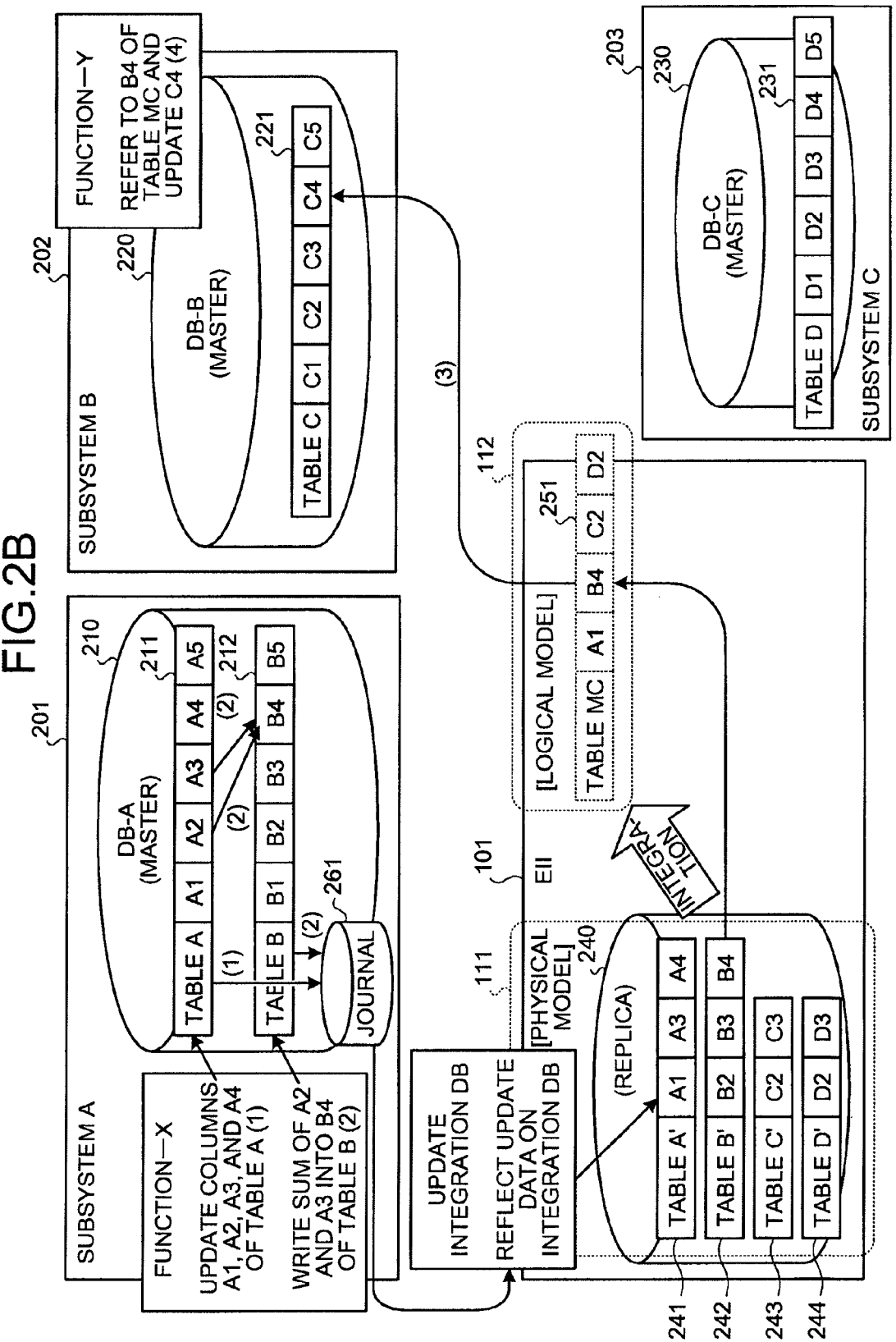

FIGS. 2A and 2B are explanatory views of the principle of the EII according to the present invention in an example. In FIG. 2A, reference numerals 201, 202, and 203 denote a subsystem A, a subsystem B, and a subsystem C, respectively. The subsystem A 201 includes a database A (DB-A) 210 having a table A 211 and a table B 212; the subsystem B 202 includes a database B (DB-B) 220 having a table C 221; and the subsystem C 203 includes a database C (DB-C) 230 having a table D 231.

Information of the subsystems A 201, B 202, C 203, i.e., information of the DB-A 210, the DB-B 220, and the DB-C 230 is defined as the master information. Therefore, these data management is independently performed in each of the subsystems A 201, B 202, C 203. Information desired to be shared among the master DBs (the DB-A 210, the DB-B 220, and the DB-C 230) is published to the EII 101. Therefore, the subsystems can manage their own information entirely. In FIGS. 2A and 2B, although the table A 211 consists of data items "A1" to "A5", a table A' 241 of the physical model 111 virtually includes only the information of "A1", "A3", and "A4", indicating that only "A1", "A3", and "A4" are shared and "A2" and "A5" are not shared with regard to the table A 211.

In the virtual integration, information is collected and integrated from the master DBs 210, 220, and 230 when a need arises. In the physical integration, a replica 240 of the master DB is preliminarily stored in the EII 101, i.e., the replication of information is performed.

The EII 101 also has a function of providing the integration result to the utilizing application. In FIGS. 2A and 2B, reference can be made to the integration result as a logical model 112, which is a table MC 251 dedicated to the subsystem B 202. Details of the conversion (integration process) from the physical model 111 to the logical model 112 are described hereinafter.

In FIG. 2A, solid lines denote tables, and dashed lines denote virtual tables. Therefore, solid lines are used to represent the table A 211 and the table B 212 of the DB-A 210, the table C 221 of the DB-B 220, the table D 231 of the DB-C 230, and a replica table D' 245, and dashed lines are used to represent the tables 241 to 243 of the physical model 111 and the table MC 251 of the logical model 112. In FIG. 2B, solid lines are used to represent the tables 241 to 244 since these are replicas.

The operations of the function-X and the function-Y are discussed here. The operations of the function-X and the function-Y and the targets of the operations, i.e., the table A 211, the table B 212, and the table C 221 are assumed to be the same as the operations of the function-X and the function-Y and the targets of the operations, i.e., the table A 2211, the table B 2212, and the table C 2221 of the conventional technology shown in FIGS. 22 and 23.

FIG. 2A is an explanatory view of an example of the virtual integration as a principle of the EII according to the present invention. First, the function-X of the subsystem-A 201 is executed, which is "update columns A1, A2, A3, and A4 of table A (1)". Therefore, the subsystem-A 201 updates "A1", "A2", "A3", and "A4" of the DB-A 210. "Write sum of A2 and A3 into B4 of table B (2)" is then executed. Therefore, the subsystem-A 201 writes the sum of "A2" and "A3" in the table A 211 into "B4" of the table B 212. As above, the processes implemented within the subsystem before execution of the data integration are independently completed as transactions closed in the subsystem. These processes are implemented as the function of the subsystem A 201 before EII is introduced, which indicates that subsystem modification due to introduce EII is not required.

Especially, since the process related to data update is closed in the subsystem, even in the case of rollback, i.e., if a related process must be terminated and related information must be recovered to the state before the process had been initiated due to some kind of abnormality occurring during the transaction, the rollback can easily be executed with certainty. Therefore, load on the application is reduced, and changes in the application have no effect outside the subsystem.

The function-Y of the subsystem B 202 is then executed, which is "refer to B4 of table MC 251 and update C4 (3)". Therefore, the subsystem B 202 requests "B4" of the MC 251 managed as the logical model 112 of the EII 101 by a search statement. The EII 101 refers to "B4" of the DB-A 210 and makes a reply to return the result as "B4" of the table MC 251 to the subsystem B 202. The subsystem B 202 updates "C4" based on the result of the reply. Therefore, since the data are collected from the information source at the time of request from the utilizing system in the case of the virtual integration, it can be assured that the information is the latest information at the time. Although a reference load falls upon the subsystem-A 201 that is the information source when information is collected, the load is considerably alleviated as compared to the transaction load at the time of update in the conventional technology shown in FIG. 23.

When collecting and integrating data present in plural information sources managed in different systems, the data integration apparatus (EII 101) according to the embodiment of the present invention directly collects data in the form of the data model (physical model 111) of the information sources, performs necessary conversion of the data configuration and/or the data value, at least one thereof, such that the data take a form of the data model (logical model 112) preliminarily defined for each of the utilization-side applications (e.g., the subsystem B 202) of the data, and provides the converted data to the utilization-side applications.

The data are collected from the information sources in real time based on the request from the utilization-side application. The virtual integration database (tables 241 to 243) is created that includes meta-information limited to the meta-information for the data to be published that is among the data stored in the master database provided on the subsystem, and data configuration conversion and/or data value conversion (mapping, cleansing), at least one thereof, is performed based on the meta-information included in the virtual integration database created.

FIG. 2B is an explanatory view of an example of the physical integration as a principle of the EII 101 according to the present invention. In FIG. 2B, to alleviate the reference load on the information-source subsystems, a journal is provided in the DB of each information-source subsystem to record the update of the DB for each transaction, and the journal is used to reflect the update of the information sources in the replica of the integration DB.

In FIG. 2B, when the function-X is executed to "update columns A1, A2, A3, and A4 of table A (1)" and to "write sum of A2 and A3 into B4 of table B (2)" as is the case with FIG. 2A, an update record of the DB-A 210 is generated as a journal 261 for each transaction. This journal 261 is used to notify the EII 101 of the update of the DB-A 210 and reflects the update in the table A' 241 and the table B' 242 of the replica 240 on the EII 101 to achieve synchronization between the DB-A 210 serving as the information source and the replica 240 on the EII 101.

The subsystem B 202 also accesses the logical model 112 of the EII 101 as is the case with FIG. 2A and acquires "B4" of the table MC 251 to update "C4". The EII 101 only needs to refer to "B4" stored in the table B' 242 of the replica 240 to give a reply to the subsystem B 202 in this case. As above, in the case of the physical integration, the access performance from the utilizing system (the subsystem B 202 of FIG. 2B) is improved, and the load on the information source (the subsystem A 201 in the case of FIG. 2B) is minimized. Even when the information source is stopped, the information immediately before the stop is stored in the replica and can be utilized.

In the physical integration of the data integration apparatus (EII 101) according to the embodiment of the present invention, a replicated database (replica 240) is generated including data limited to the data to be published that is among data stored in the master databases provided in the subsystems and the replicated database generated is updated in synchronization with the update of the master databases, and data from the replicated database is collected.

Figure 3:
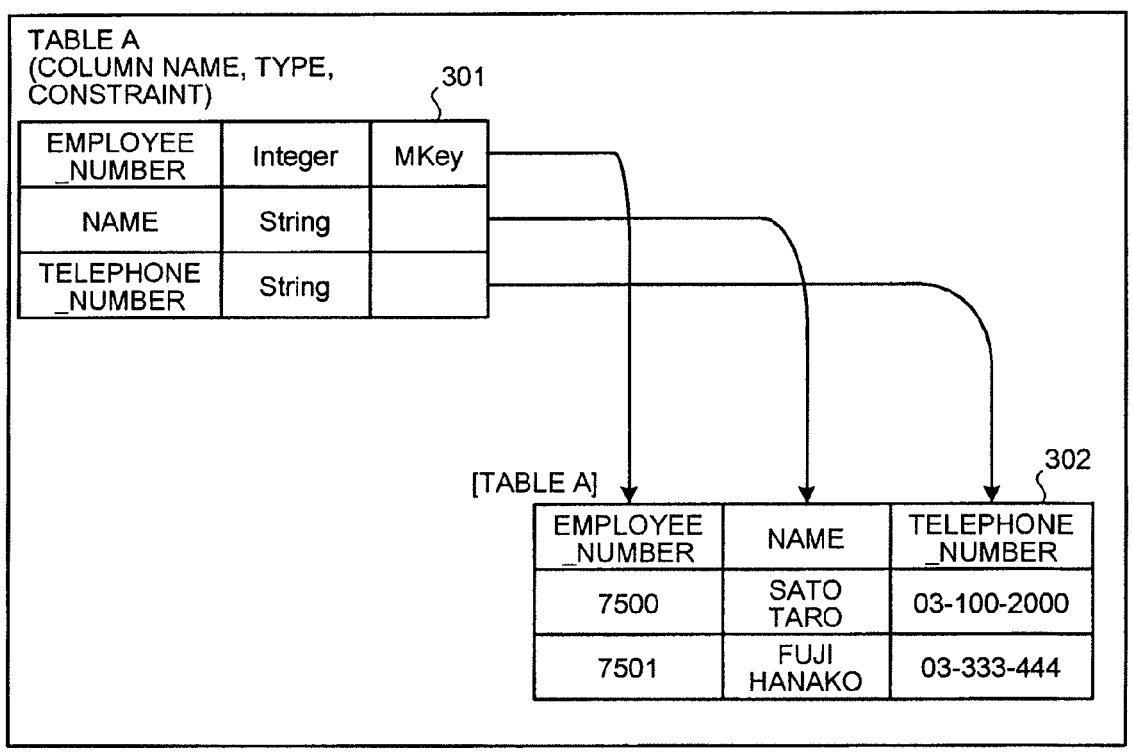
FIG. 3 is an explanatory view of an example of a schema of a table.

A specific example of the data integration in the EII 101 is described. FIG. 3 is an explanatory view of an example of a schema of a table. In FIG. 3, a reference numeral 301 denotes a schema of a table, which shows a table name=A and column names, types, and constraints, and a reference numeral 302 denotes an actual table A based on the schema 301.

That is, the column names in the table A are "employee_number", "name", and "telephone_number". The types of data values included in the columns are Integer (integer type) and String (character string type). Each data value can have some type attributes as information defining details of the type. For example, in the case of Integer, a type attribute "MaxLength=10" can indicate the type to be an integer of up to ten digits. Similarly, in the case of String (character string type), a type attribute "CharCode=S_JIS" can indicate that the character code of the character string is the shift JIS code. The constraints of the columns are Mkey (primary key constraint) and Skey (foreign key constraint).

In FIG. 3, the employee_number is Integer (integer type), and the name and the telephone_number are String (character string type). FIG. 3 also indicates that the employee_number have the constraint of the Mkey (primary key constraint).

Figure 4:
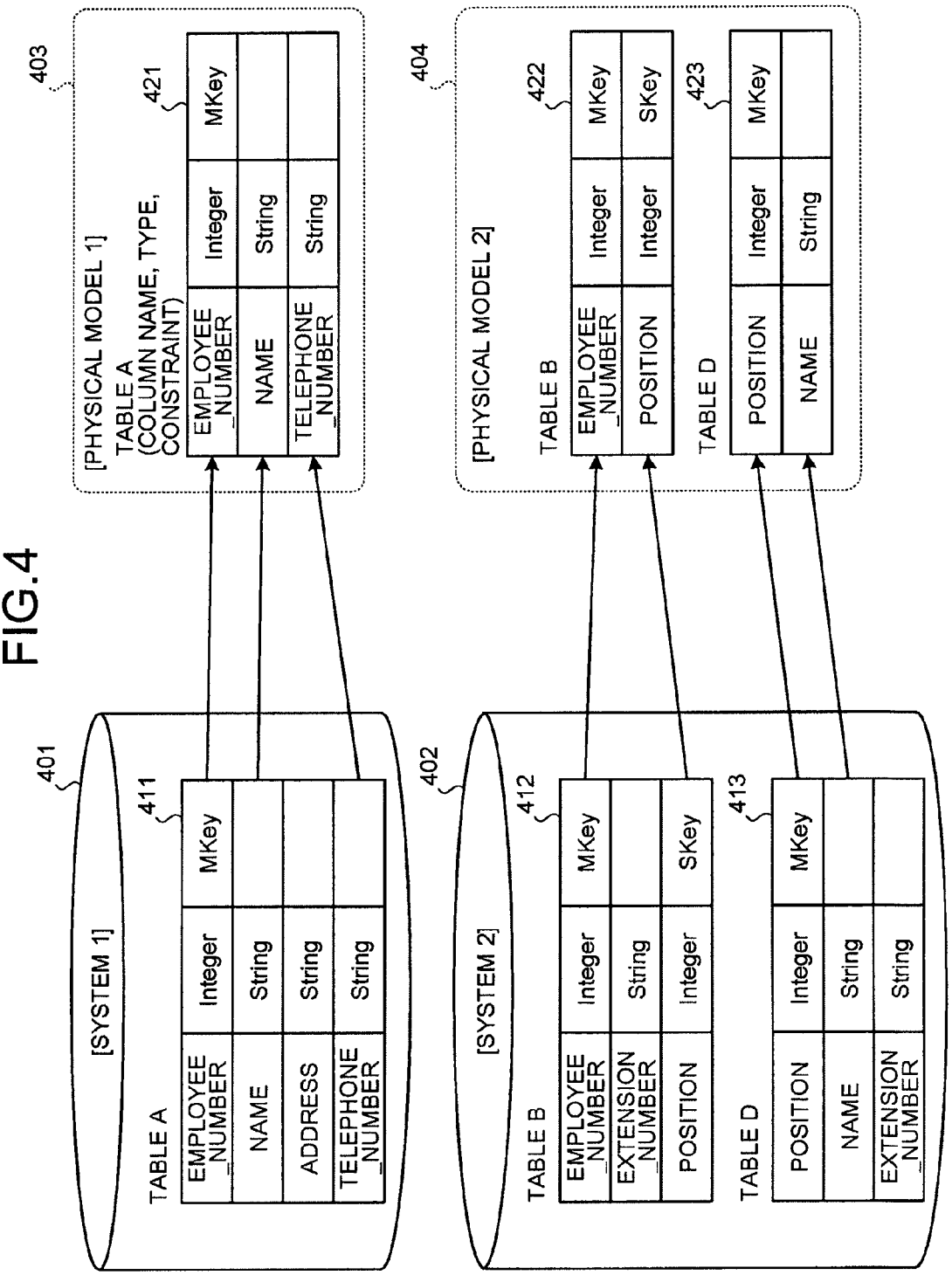
FIG. 4 is a schematic of architecture of the integration engine (definition of a physical model)

FIG. 4 is a schematic of architecture of the integration engine (definition of the physical model). The definition of the physical model is performed as an operation of the meta-information maintenance function 117 shown in FIG. 1, for example. In FIG. 4, an information source system 1 401 includes a table A 411; an information source system 2 402 includes table B 412 and table D 413; a physical model 1 403 includes a table A 421 and corresponds to the system 1 401; and a physical model 2 404 includes table B 422 and table D 423 and corresponds to the system 2 402.

The EII 101 acquires a schema of a table to be shared and creates a physical model based on the acquired information. On this occasion, unnecessary columns are deleted, and the column names, the types, the type attributes, etc., are modified in the registered physical model. In FIG. 4, since it is determined in the system 1 401 that information of an "address" column of the table A 411 is not shared, the information is deleted from the physical model. This also applies to an "extension_number" column of the table B 412 and an "extension_number" column of the table D 413.

Figure 5:
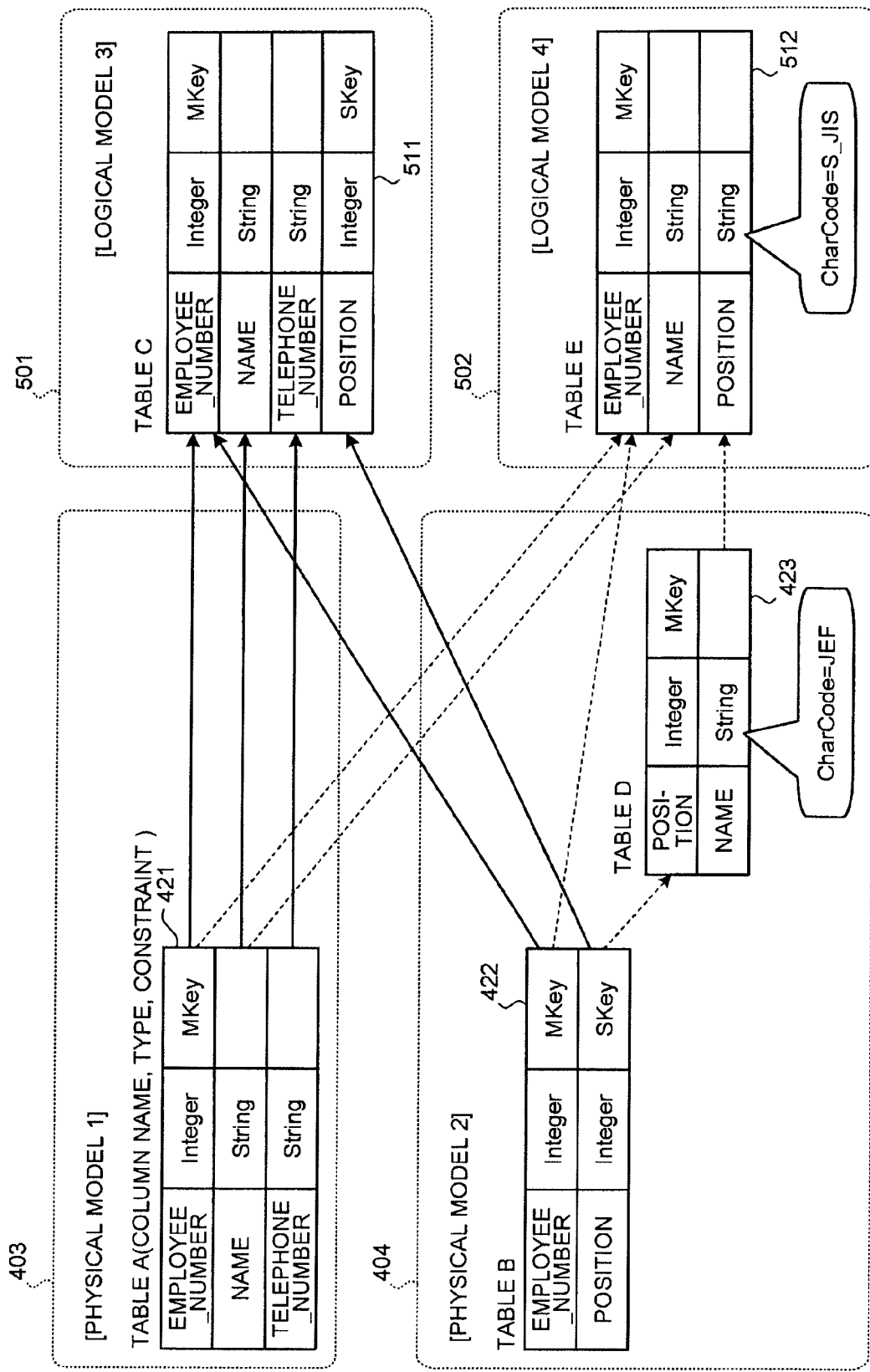
FIG. 5 is a schematic of architecture of the integration engine (mapping)

FIG. 5 is a schematic of architecture of the integration engine (definition of the mapping). The definition of the mapping is performed as an operation of the meta-information maintenance function 117 shown in FIG. 1, for example. In the definition of the mapping, a logical model is defined based on a defined physical model. The preconditions of the mapping definition of FIG. 5 are that the information sources are the system 1 401 (physical model 1 403) and the system 2 402 (physical model 2 404) and that the utilization side includes a logical model 3 501 necessary for a system 3 601 (shown in FIG. 6) and a logical model 4 502 necessary for a system 4 602 (shown in FIG. 6). It is assumed that the four systems use the same employee codes (keys).

In FIG. 5, first, necessary items of the physical models 403, 404 are set in the logical models 501, 502. Specifically, "employee_number", "name", and "telephone_number" from the table A 421 of the physical model 1 403 and "employee_number" and "position" from the table B 422 of the physical model 2 404 are set in a table C 511 of the logical model 3 501. When plural tables (e.g., tables A and B) are linked (JOIN), definition is made by linking the Mkey constraint column of the target table to the Mkey constraint column of the logical model. The column names, the types, the type attributes, and the constraints taken over from the physical models are set in the logical model, and the mapping definition is automatically created.

If a certain column is converted with another table at the time of the setting in a table E 512 of the logical model 4 502, definition is performed by linking an intermediate table (table D 423) between tables. That is, the "position" of the table B 422 is the "Integer" representing a position code, which is converted into the "String" representing a position name with the use of the intermediate table D 423. In the table E 512 of the logical model 4 502, the conversion result, i.e., the "String" is set as the "position" column. This is defined by linking the Skey of the target table to Mkey of the intermediate table and linking the converted column to the logical model.

Necessary modifications are then made for the logical model. For example, unnecessary columns are deleted (however, a column with the Mkey constraint cannot be deleted), and the column names, the types, the type attributes, etc., are changed. For example, since the "name" column of the table D 423 is the String (character string type) and the type attribute is set to "CharCode=JEF", the position column of the initial logical model table E 512 is a column name="name", a data type=character string, and a type attribute="CharCode=JEF". For the logical model 4 502, to change the column as necessary, the column name is changed to "position" and the type attribute is changed to "CharCode=S_JIS". These changes are reflected to the mapping definition and the cleansing definition. These pieces of meta-information necessary for the integration process are stored in the repository 116 and utilized through the integration engine 110 when the need arises.

Figure 6:
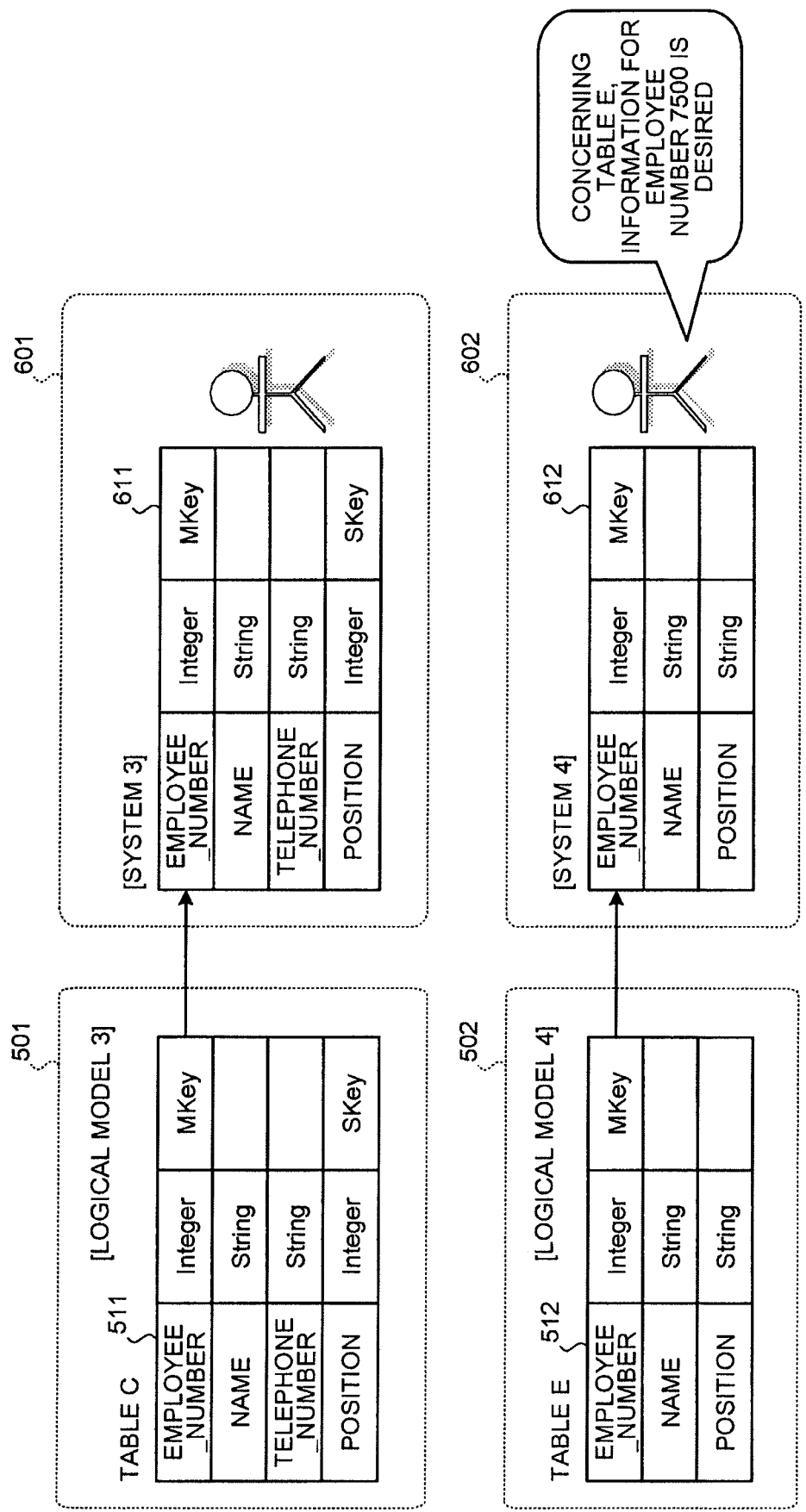
FIG. 6 is a schematic of architecture of the integration engine (inquiry)

FIG. 6 is a schematic of architecture of the integration engine (inquiry). The utilization-side systems (the system 3 601 (e.g., including a table 611 for the internal information format) and the system 4 602 (e.g., including a table 612 for the internal information format)) can issue a search (SQL) statement for the prearranged logical models (the logical model 3 501 and the logical model 4 502) to acquire necessary information. Since the internal expression of the acquired information is identical to that of the systems, the information can be used without change. The actual operation is described here with reference to FIG. 7 for a case in which the system 4 602 issues a request concerning the table E 512 to indicate that the information of the employee number 7500 is desired.

Figure 7:
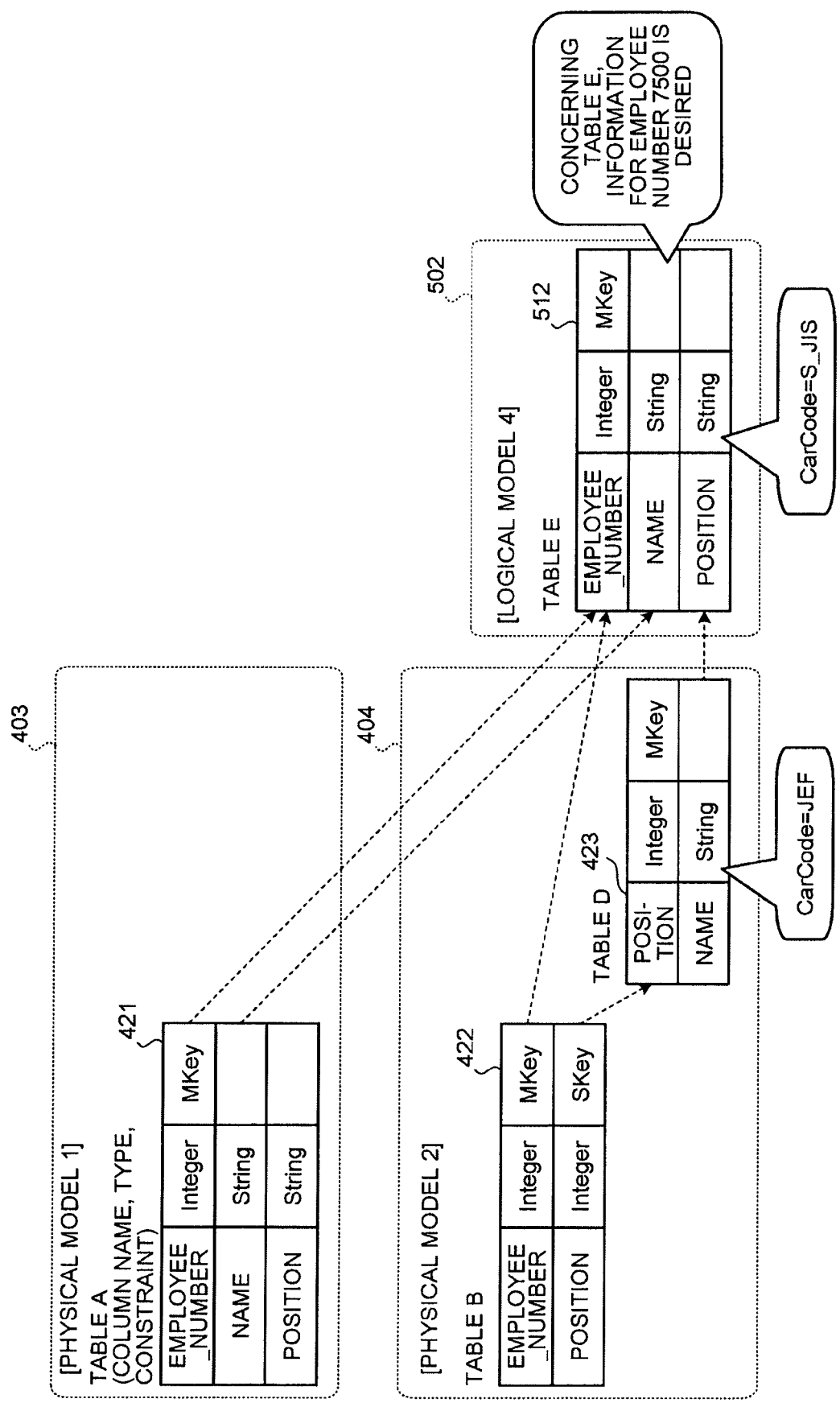
FIG. 7 is a schematic of architecture of the integration engine (actual operation)

FIG. 7 is a schematic of architecture of the integration engine (actual operation). The actual integration process is executed in the integration engine 110 shown in FIG. 1, for example. In FIG. 7, first, "employee_number=7500" is determined as a search condition for the table E 512 of the logical model 4 502. The EII 101 converts the search condition for the obtained logical model into a search condition for the physical model. This is a search condition derivation (inverse transform) process. Since the "employee_number" column of the table E 512 of the logical model 4 502 is obtained from the employee_number of the table A 421 of the physical model 1 403 and the employee_number of the table B 422 of the physical model 2 404, the search conditions of "the employee_number of the table A=7500" and "the employee_number of the table B=7500" are generated. The search statement is executed for the table A 421 to acquire a search result A. The employee number column and the name column are copied from the search result A of the table A 421. This is the result integration process.

The search statement is then executed for the table B 422 of the physical model 2 404 to acquire a search result B. Although the position column is fetched from the search result B of the table B 422, since the position column of the search result B is a position code, the table D 423 is used to define the result of conversion to a name as a value of the position column. This is a value conversion process. Since a shift JIS string is required for the position column of the table E 512 although the name column of the table D 423 is a JEF code string, a "JEF to shift JIS" cleansing function (described later in detail) is operated and the result is copied to the position column of the table E 512.

Figure 8:
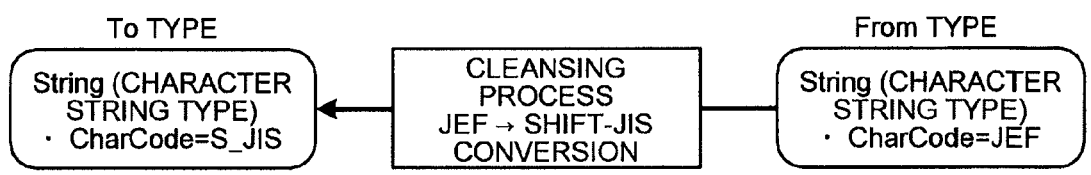
FIG. 8 depicts an example of the cleansing due to a difference between the type attributes.
Figure 9:
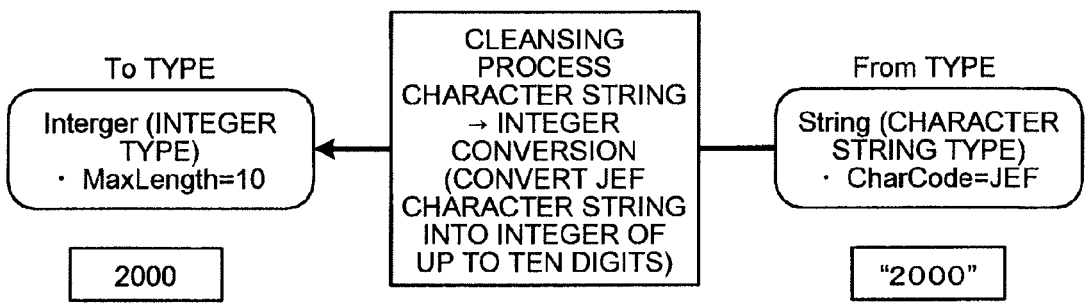
FIG. 9 is a schematic of an example of a cleansing function executed when types differ.

FIGS. 8 and 9 are explanatory views of architecture of the integration engine (cleansing). In the cleansing, a type check is performed when copying of a value occurs, and if the type or the type attribute is different between the copy source (From type) and the copy destination (To type), a necessary process is executed correspondingly to the types and the type attributes. FIG. 8 depicts an example of the cleansing due to a difference between the type attributes. In FIG. 8, although both data types are the String (character string type) and identical to each other, since the type attributes are different, the cleansing process of conversion from the JEF to the shift JIS is executed for conversion from the type attribute of the From type (CharCode=JEF) to the type attribute of the To type (CharCode=S_JIS), and the result is copied to the copy destination.

Other than the character code system conversion (character type), for example, the character string conversion (character string type) is included in the cleansing function executed when the type attributes are different. Specifically, the character string conversion includes removal of all spaces, removal of preceding and subsequent spaces, packing of consecutive spaces into one space, tab/space conversion, removal of linefeed codes, conversion of linefeed codes, two-byte/one-byte conversion, alphabetic upper-case/lower-case conversion, replacement of characters (using a replacement table), etc.

Another cleansing function includes unit conversion (from "three thousand" yen to "3,000" yen or vice versa) (character string type/numeric value type), conversion between notation of the year in terms of Japanese eras and the Western calendar (from Heisei 16 to 2004 or vice versa) (character string type/ numeric value type), conversion between numeric notations (from Chinese numerals representing sixteen to 16 or vice versa) (character string type/numeric value type), conversion of the number of significant figures (character string type, increase or decrease in the number of significant figures), conversion of the number of significant characters (character string type, increase or decrease in the number of significant characters), etc.

FIG. 9 depicts an example of the cleansing function executed when types differ. In FIG. 9, the cleansing process is executed to convert the String (character string type) data of a JEF code string "2000" (including four characters, all of which are two-byte characters) from a character string to an integer, which is an integer of up to ten digits. As a result, the data are converted to data of "2000" (a four-digit integer).

As described above, the data integration apparatus according to this embodiment of the present invention can perform at least one of the following data-value conversions including the character code system conversion process for converting a difference between character code systems, the character string conversion process for performing normalization of character strings including the removal of spaces and the two-byte/one-byte character conversion, the unit conversion process for converting a difference between units of characters or numbers, the year notation conversion process for converting a difference between notation of the year according to a Western calendar system and a Japanese calendar system, the Chinese numeral notation conversion process for converting a difference in numeric expression between the Chinese numeral/Arabic numeral/Roman numeral and a numeric value, the significant figure conversion process for conforming the number of significant figures of a numeric value, and the conversion process between the data types.

Figure 10:
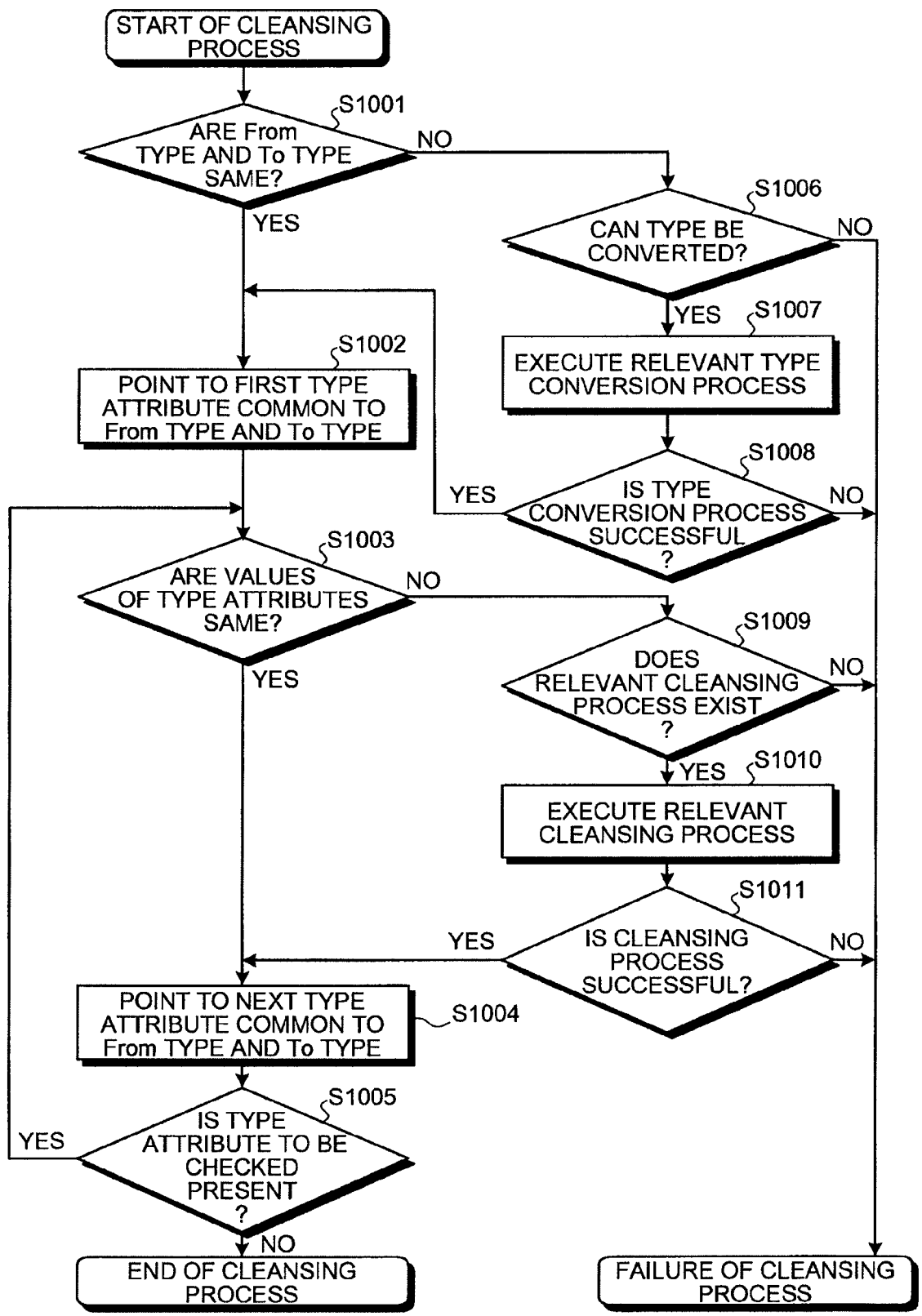
FIG. 10 is a flowchart detailing a cleansing process.
Figure 11:
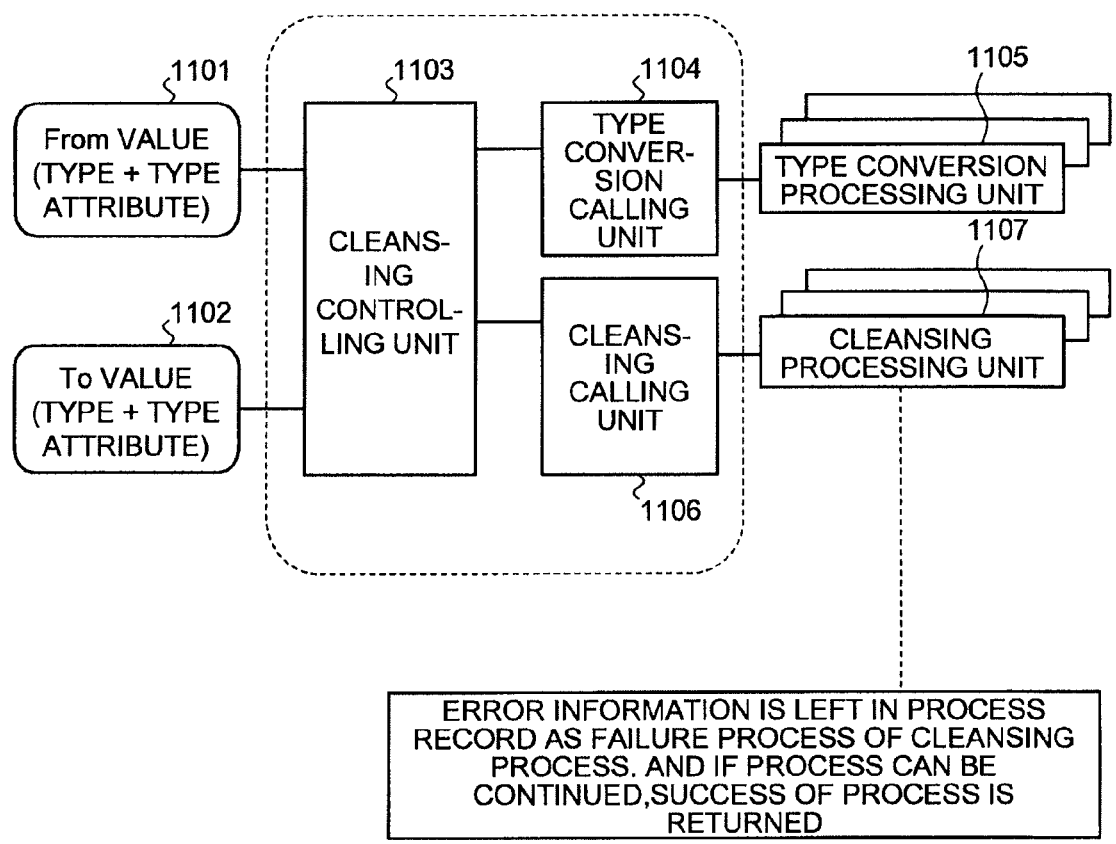
FIG. 11 is a schematic of a functional configuration executing a process of the flowchart shown in FIG. 10.

FIG. 10 is a flowchart detailing the cleansing process, and FIG. 11 is a schematic of a functional configuration executing a process of the flowchart shown in FIG. 10. In the flowchart of FIG. 10, first, a cleansing controlling unit 1103 determines whether the From type of a From value 1101 shown in FIG. 11 is the same as the To type of a To value 1102 (step S1001). If both are the same (step S1001: YES), the first type attribute common to the From type and the To type is pointed to (step S1002).

It is determined whether the values of the type attribute are the same (step S1003). If values of the type attribute are the same (step S1003: YES), the next type attribute common to the From type and the To type is pointed to (step S1004). It is determined whether a type attribute to be checked is present (step S1005), and if the type attribute is present (step S1005: YES), the flow returns to step S1003 and, subsequently, steps S1003 to S1005 are repeatedly executed. If no type attributes to be checked are present (step S1005: NO), a sequence of the cleansing process is terminated.

If the From type and the To type are different at step S1001 (step S1001: NO), it is determined whether the data type can be converted (step S1006). If the data type cannot be converted (step S1006: NO), a failure process of the cleansing process is executed. On the other hand, if the data type can be converted (step S1006: YES), a type conversion calling unit 1104 shown in FIG. 11 calls for the type conversion and a type conversion processing unit 1105 shown in FIG. 11 executes a relevant type conversion process (step S1007).

It is determined whether the type conversion process is successful (step S1008). If the type conversion process is successful (step S1008: YES), the flow goes to step S1002. On the other hand, if the type conversion process fails (step S1008: NO), the failure process of the cleansing process is executed.

If the values of the type attribute are different at step S1003 (step S1003: NO), a cleansing calling unit 1106 shown in FIG. 11 calls for the type attribute conversion and it is determined whether a relevant cleansing function exists (step S1009). If no relevant cleansing function exists (step S1009: NO), the failure process of the cleansing process is executed. On the other hand, if relevant cleansing function exists (step S1009: YES), a cleansing processing unit 1107 shown in FIG. 11 executes the relevant cleansing function (step S1010).

It is then determined whether the executed cleansing process is successful (step S1011). If the cleansing process is successful (step S1011: YES), the flow goes to step S1004. On the other hand, if the cleansing process fails (step S1011: NO), the failure process of the cleansing process is executed.

FIG. 12 is a flowchart detailing the mapping process. In the flowchart of FIG. 12, first, search conditions for the physical model are created with search conditions for the logical model and the mapping definition (step S1201). The details thereof are described hereinafter (see flow 1 of FIG. 17). The first search condition of the physical model is pointed to (step S1202), and the search condition is executed for the physical model to acquire relevant data (step S1203).

It is determined whether the search is successful, and if the search fails (step S1204: NO), a mapping failure process is executed. On the other hand, if the search is successful (step S1204: YES), the relevant data of the search result are copied to the logical model (step S1205). The details thereof are described hereinafter (see flow 2 of FIG. 20). It is determined whether the copy is successful (step S1206), and if the copy fails (step S1206: NO), the mapping failure process is executed.

On the other hand, if the copy is successful (step S1206: YES), the next search condition is pointed to (step S1207). It is determined whether any search condition remain (step S1208), and if any search condition remain (step S1208: YES), the flow returns to step S1203 to repeatedly execute steps S1203 to S1208. If no search condition remain at step S1208 (step S1208: NO), a sequence of the mapping process is terminated.

Figure 15:
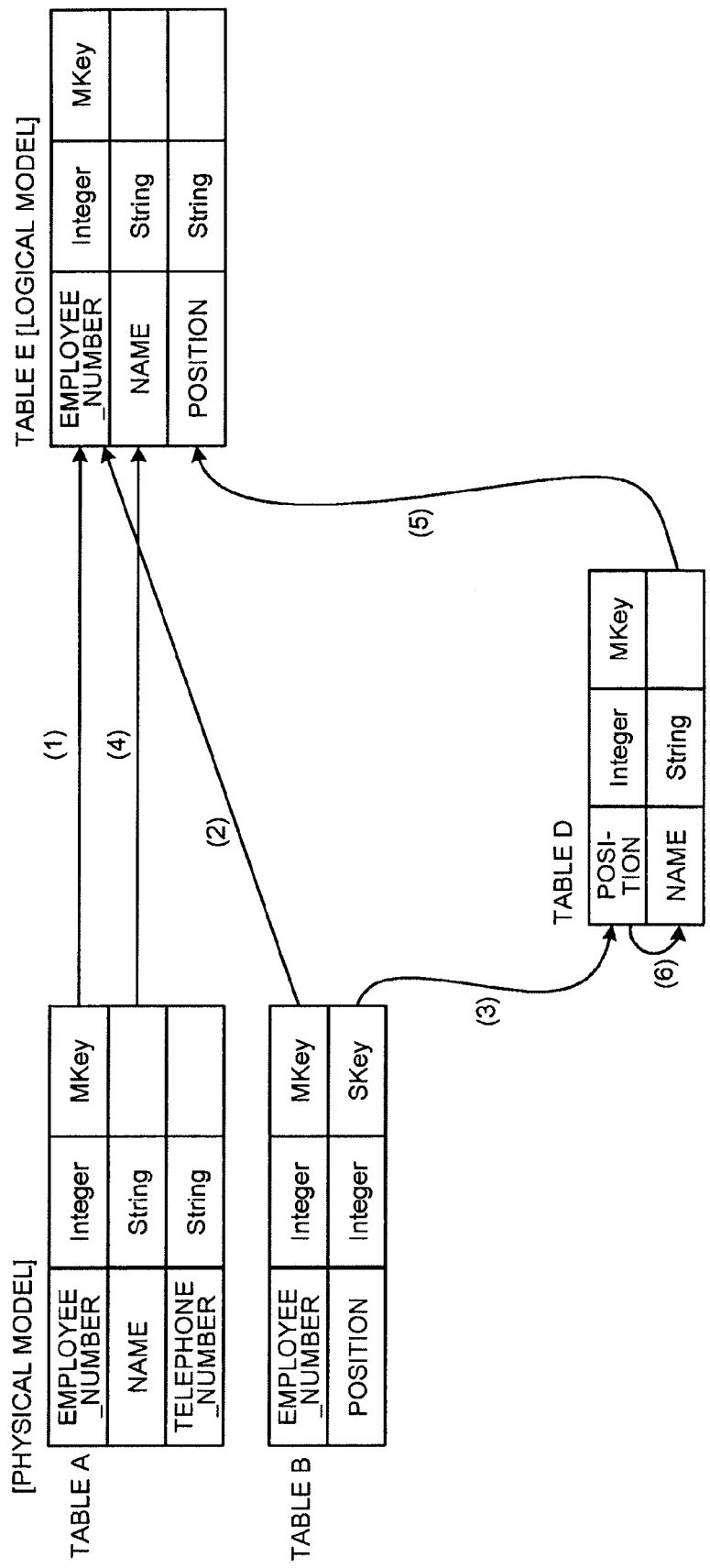
FIG. 15 is a schematic of the mapping control based on the mapping definition of FIG. 13.

FIG. 13 is a schematic of an example of the mapping definition; FIG. 14 is a schematic of an example of evaluation points; and FIG. 15 is a schematic of the mapping control based on the mapping definition of FIG. 13. In FIG. 13, "E.name" indicates the name column of the table E, and parenthetic numbers (1) to (6) correspond to (1) to (6) of FIG. 15, respectively. For example, the mapping definition indicated by (1) of FIG. 13 represents that the employee_number column of the relevant data of the table A of FIG. 15 is correlated with (copied to) the employee_number column of the table E.

As indicated by (6) of FIG. 13, the corresponding mapping definition is created for the conversion through the intermediate table. This mapping definition is created for each table of the logical model, and the contents thereof are sorted in the order of evaluation points. FIG. 14 shows an example of a basis for evaluation point derivation. FIG. 16 is a schematic of an example of a search condition issued from the utilization-side application.

Figure 17:
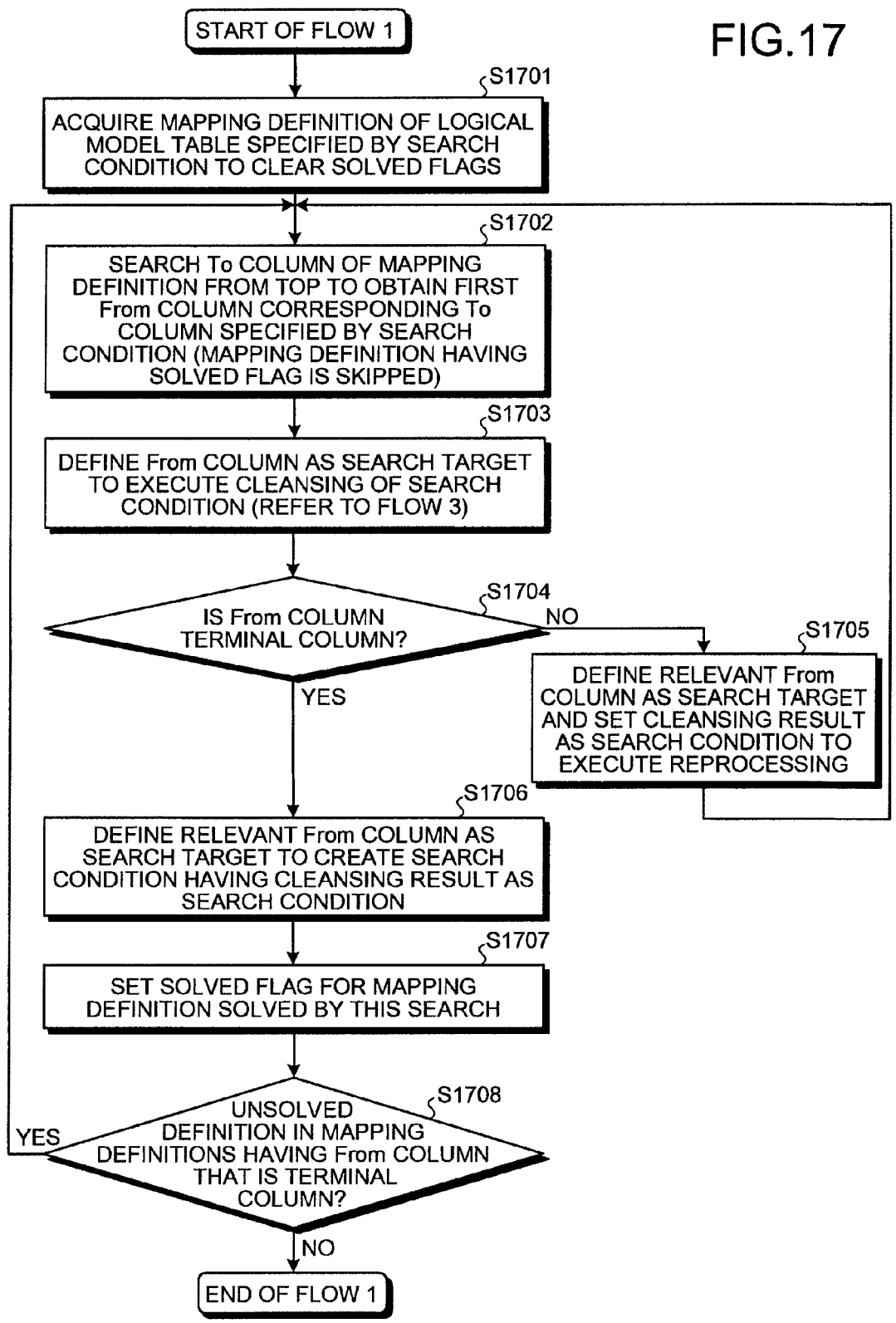
FIG. 17 is a flowchart detailing the mapping process.

FIG. 17 is a flowchart (flow 1) detailing the mapping process (details of S1201); and FIG. 18 is a schematic of an example of the mapping definition used in FIG. 17. In the flowchart of FIG. 17, the mapping definition is acquired for the logical model table (table E) specified by the search condition shown in FIG. 16 to clear solved flags (step S1701). That is, all the "solved_flag" of FIG. 18 are set to "0".

The To column of the mapping definition is searched from the top to obtain the first From column corresponding to the column specified by the search condition (step S1702). The mapping definition having the solved flag is skipped. For example, "E.employee_number" specified as the search condition shown in FIG. 16 is searched in the To column to obtain "A.employee_number" as the From column. The corresponding From column is defined as a search target to execute the cleansing of the search condition (step S1703). Details of step S1703 are described hereinafter (see flow 3 of FIG. 21).

It is then determined whether the From column is a terminal column (step S1704). The terminal column means a column not existing in the To column (original From column). If the From column is not the terminal column (step S1704), the relevant From column is defined as the search target and the cleansing result is set as the search condition to execute the search condition cleansing processing again (step S1705). Subsequently, the flow returns to step S1702. For example, if a search condition is derived for "D.name" of the From column of FIG. 18(5), since "D.name" exists in the To column (on the sixth line), the search condition of "D.position" must be derived again. In this case, conversion to the search condition of "B.position" (on the third line) is performed again, and this serves as the terminal column. The multi-step mapping such as conversion with the intermediate table is supported through the loop of steps S1702 to S1705.

If the From column is the terminal column at step S1704 (step S1704: YES), the relevant From column is defined as the search target to create a search condition having the cleansing result as the search condition (step S1706). FIG. 19 is an example of the created search conditions. A solved flag is set for the mapping definition solved by this search (step S1707). That is, the "solved_flag" of FIG. 18 is set to "1". The solved_flag means that the relevant mapping can be implemented by copying the data sequence of the search result. For example, since the mapping corresponding to (1) and (4) of FIG. 15 is solved by the search on the first line of FIG. 19, the first line and the fourth line of the solved_flag column of FIG. 18 can be set to "1".

It is then determined whether an unsolved definition is present among the mapping definitions having the From column that is the terminal column (i.e., whether the "solved_flag" defined as "0" exists) (step S1708). If an unsolved definition is present (step S1708: YES), the flow returns to step S1702. Steps S1702 to S1708 are then repeatedly executed. If no unsolved definition is present (step S1708: NO), a sequence of the process of flow 1 is terminated, and the flow goes to step S1202 shown in FIG. 12. FIG. 18 depicts this state (the case that no unsolved definition is present at step S1708). That is, all the mapping definitions (1) to (4) are solved when the From column is the terminal column.

Figure 20:
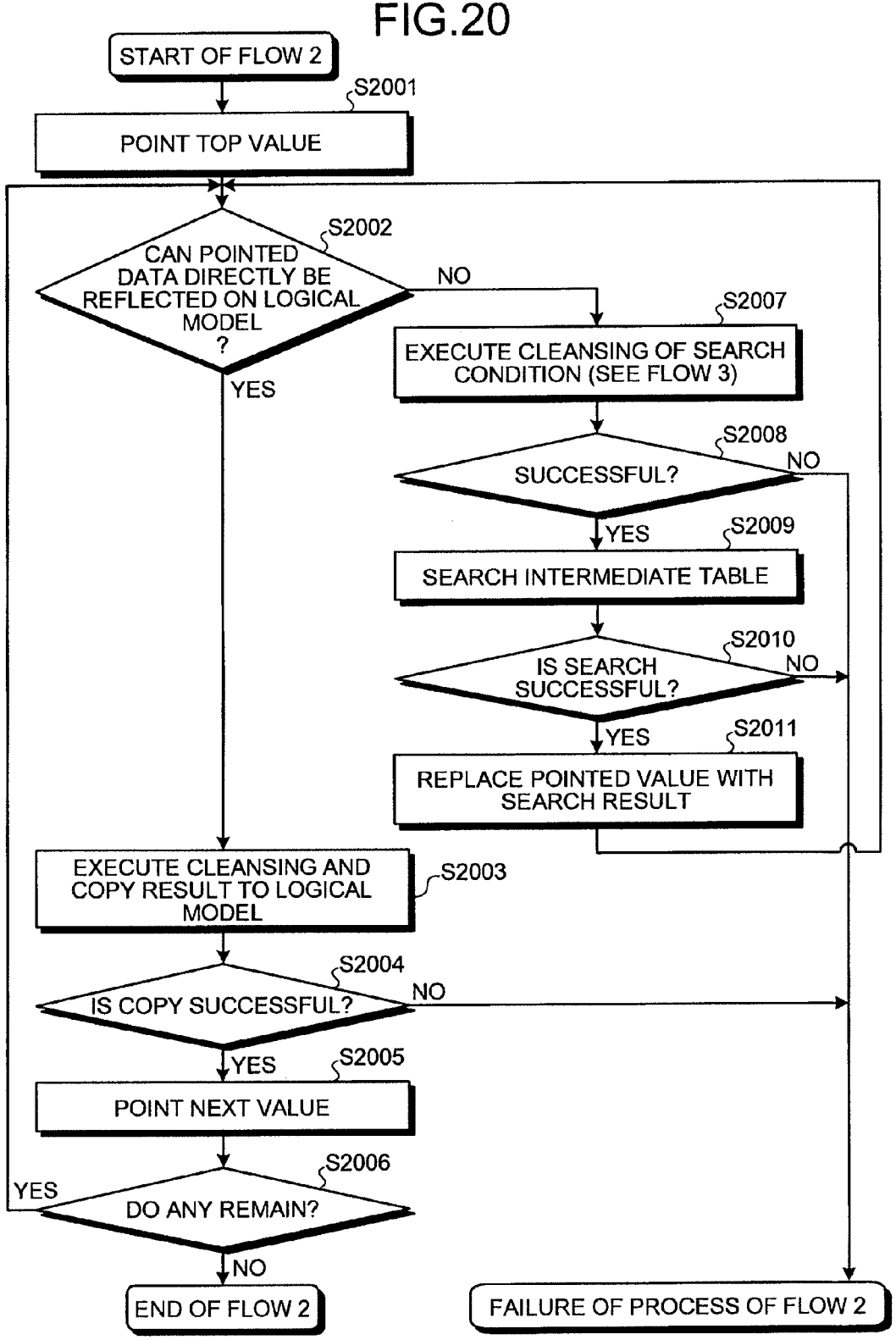
FIG. 20 is a flowchart detailing the mapping process.

FIG. 20 is a flowchart (flow 2) detailing the mapping process (details of S1205) and depicts details of the process of reflection to the logical model. In the flowchart of FIG. 20, first, the beginning of the relevant data is pointed to (step S2001). It is then determined whether the data pointed to can directly be reflected on the logical model (step S2002). If the data can be directly reflected in the logical model (step S2002: YES), the cleansing is executed and the result is copied to the logical model (step S2003).

It is determined whether the copying is successful (step S2004), and if the copying fails (step S2004: NO), it is determined that the process of the flow 2 fails and the flow goes to step S1206 of the flowchart shown in FIG. 12. If the copying is successful (step S2004: YES), the next value is pointed to (step S2005). It is determined whether any values remain (step S2006). If any values remain (step S2006: YES), the flow returns to step S2002. On the other hand, if no values remain (step S2006: NO), a sequence of the process of the flow 2 is terminated and the flow goes to step S1206 of the flowchart shown in FIG. 12.

If the data cannot directly be reflected in the logical model (step S2002: NO), the target data value is defined as the search condition and the relevant column of the intermediate table is defined as the search target to execute the cleansing of the search condition (step S2007). Details of this process are described later (see flow 3 of FIG. 21). It is determined whether the cleansing is successful (step S2008) and if the cleansing fails (step S2008: NO), it is determined that the process of the flow 2 fails and the flow goes to step S1206 of the flowchart shown in FIG. 12.

The intermediate table is then searched (step S2009) and it is determined whether the search is successful (step S2010). In the case of failure (step S2010: NO), it is determined that the process of the flow 2 fails and the flow goes to step S1206 of the flowchart shown in FIG. 12. If the search is successful (step S2010: YES), the value pointed to is replaced with the search result (step S2011), and the flow then returns to step S2002. The data value conversion process through the intermediate table is implemented by S2007 to S2011.

Figure 21:
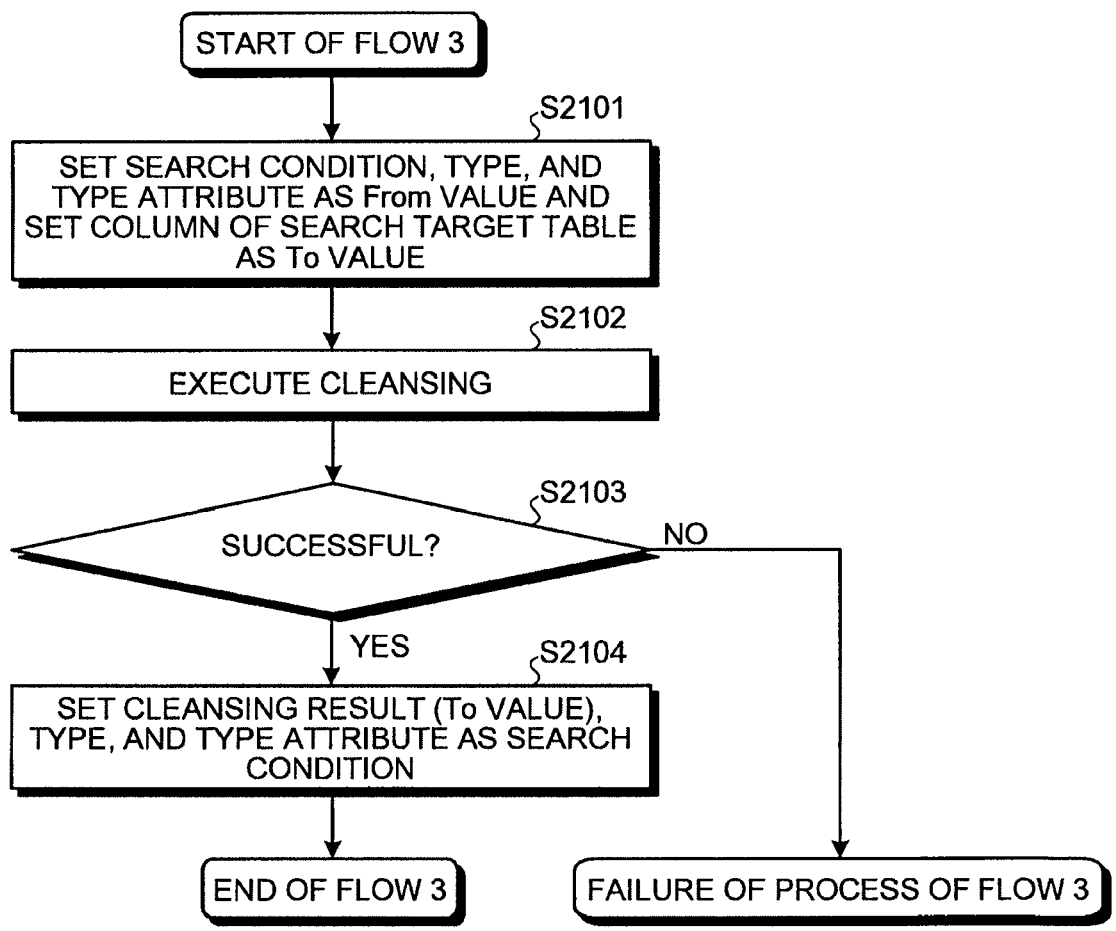
FIG. 21 is a flowchart detailing the mapping process.

FIG. 21 is a flowchart (flow 3) detailing the mapping process (details of S2007 and S1703) and depicts details of the cleansing process for the search condition. In the flowchart of FIG. 21, the search condition, the type, and the type attribute are set as the From value and the column of the search target table is set as the To value (step S2101). The cleansing is then executed (step S2102). It is determined whether the cleansing is successful (step S2103). If the cleansing fails (step S2103: NO), it is determined that the process of the flow 3 fails and the flow goes to step S2008 of the flowchart shown in FIG. 20 or step S1704 of the flowchart shown in FIG. 17.

On the other hand, if the cleansing is successful (step S2103:YES), the cleansing result (To value), the type, and the type attribute are set as the search condition (step S2104). As a result, a sequence of the process is terminated, and the flow goes to step S2008 of the flowchart shown in FIG. 20 or step S1704 of the flowchart shown in FIG. 17. The cleansing process (S2003, S2102) for the values executed in these flowcharts is implemented by the cleansing process described in FIG. 10.

As described above, according to the present invention, when collecting and integrating data present in a plurality of the separately managed information sources 103, the load on the utilization-side application 104 can be alleviated without the need for alteration of the information source 103 by collecting the data from the information sources 103 through the data model (the physical model 111) of the information sources to execute the process (mapping) of converting the data configuration into the data model (the logical model 112) predefined for each utilization-side application 104 and the process (cleansing) of converting and conforming the values in the integration process, and by providing, to the utilization-side application, the result as the view (the logical model 112) for each application.

According to the present invention, a so-called virtual integration providing the integration result in real time can be implemented by collecting information in real time from the information sources 103 at the time of request from the utilization-side application 104 and by executing the data integration process to provide the result to the utilization-side application 104.

According to the present invention, the load of accessing the information sources can be alleviated and data immediately before a stop can be utilized in data integration even during a stop period of the information sources 104 by preliminarily creating a replicated database limited to the published information of the information sources 103, i.e., the replica 240 (replicated database) in the EII 101, by applying differences of each transaction in the replica 240 (replicated database) in synchronization with the update of the information sources 103, and by implementing so-called physical integration that collects and integrates data from the replica 240 to provide the result to the utilization-side application 104 in response to the request from the utilization-side application 104.

According to the present invention, optimal data integration can be implemented since the virtual integration or the physical integration can be selected for each information source 103 or table in accordance with the nature and the operational form of the data managed in the information sources 103.

According to the present invention, at least the table names, the data sequence names, and the data types are defined as the meta-information representing the formats of the information sources 103 (the physical model 111) and the formats of the utilization-side application 104 (the logical model 112), and the type attributes defining details of types can be defined for the data types. In the cleansing process of converting each data value from the physical model 111 to the logical model 112, fine-tuned cleansing can efficiently be executed by defining a copy source as the From type and a copy destination as the To type when the data types are different to execute the type conversion function of converting a From-type data value to a To-type data value and by executing the cleansing process of conforming the type attributes when the type attributes are different.

According to this invention, the data sequence constraints such as the primary key constraint and the Foreign Key constraint are additionally defined as the meta-information to define the mapping definition representing the correlation from the tables and columns of the physical model 111 to the tables and columns of the logical model 112, and a search condition of the corresponding physical model 111 is created based on the mapping definition from a search condition for the table of the logical model 112 requested from the utilization-side application 104.

The search condition is created in the order of evaluation by the evaluation function of the mapping definition; the search condition enables the cleansing process in the opposite direction of the integration using the logical model 112 as the From type and the physical model 111 as the To type to collect data from the information sources 103 (the physical model 111) through a search condition created with the From type and the To type; and the collected data can be subjected to the mapping and the cleansing, integrated to the data of the logical model 112, and provided to the utilization-side application 104 based on the mapping definition, the data value type, and the type attribute definition.

According to the present invention, the intermediate datable for data conversion (e.g., the table D 423 shown in FIG. 5, etc.) can be defined as the mapping definition between the logical model 112 requested by the system of the utilization-side application 104 and the physical model 111 serving as the format of the information sources 103, and data models having greater differences can be integrated by integrating the result of the conversion of the data collected as the physical model 111 through the intermediate table.

According to the present invention, the cleansing enables any one of the character code system conversion process for converting a difference between character code systems, the character string conversion process for performing normalization of character strings such as the removal of spaces and the two-byte/one-byte conversion, the unit conversion process for converting a difference between units of characters or numbers, the year notation conversion process for converting a difference between notation of the year according to the Western calendar and the Japanese calendar, the Chinese numeral notation conversion process for converting a difference in numeric expression between the Chinese numeral/Arabic numeral/Roman numeral and a numeric value, the significant figure number conversion process for conforming the number of significant figures of a numeric value, and the conversion function between the data types.

According to the present invention, when managing the master data independently managed by plural systems, the master data are completely independently managed by each application of each system; the data publication to the EII 101 is defined as the physical model 111 having the format of the master data and including, among the master data, the data of use to another system; each system of the utilization-side application 104 defines a data format easily used by each application as a logical model in the EII 101; each utilization system integrates and utilizes (refers to) the published data through the logical model having the format that is easily used with respective thereto; and a mode of data update is employed to update the data by making a request to an information update function provided by the application of each information sources through service-oriented architecture (SOA), etc.

Therefore, when introducing the master data management (MDM), the master update can be simplified by eliminating the need for alteration of the information systems, by simplifying the utilization system application, by eliminating the need for a physical common master database, and by limiting the update control for transactions, etc., within each system. Even when the format of the master data (information sources) is changed, the change can be prevented from spreading to another system by changing only the definition of the logical model for the data integration apparatus to implement the efficient MDM.

As a result, the present invention enables easy introduction to existing systems and higher flexibility with respect to changes in and replacement of the systems and can satisfy both partial optimization for optimizing operation handled by each subsystem and total optimization for the overall information system through a higher degree of independence of each sub-system.

According to the embodiments described above, a data integration apparatus, a data integration method, and a computer-readable recording medium having a data integrating program stored thereon can be achieved that can alleviate the load of the utilization-side application without the need for alteration of information sources.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data integration apparatus collecting and integrating data in a plurality of information sources, comprising:
   a storing unit that stores meta information that includes
      a physical model, which is a data model corresponding to each information source and includes data items and a primary key constraint for a data item that serves as a primary key,
      a logical model, which is a data model defined for a utilization-side application utilizing integrated data and includes data items and a primary key constraint for a data item that serves as a primary key, and
      a mapping definition that defines a correspondence relation between a data item of the physical model and a data item of the logical model as a correspondence relation between a FROM column and a TO column;
   a converting unit that receives a search condition for the logical model from the utilization-side application and converts the search condition for the logical model into one or a plurality of search conditions for the physical model based on the meta information;
   a collecting unit that issues the search condition for the physical model to an information source and collects from the information source physical-model-compliant data matching the search condition for the physical model;
   an outputting unit that integrates data by converting, based on the meta information, the collected physical-model compliant data into logical-model-compliant data and outputs the logical-model-compliant data to the utilization-side application.

2. The data integration apparatus according to claim 1, wherein
   each data item of the physical model and the logical model include data types that define a type of a data value for the data item,
   the converting unit also converts a data type when a data type does not match between corresponding data items so that the data types in the search conditions for the physical model and the logical model match, and
   the outputting unit integrates data by also converting a data type when a data type does not match between corresponding data items so that the data types in the physical-model-compliant data and the logical-model-compliant data match.

3. The data integration apparatus according to claim 2, wherein each data item of the physical model and the logical model further include type attributions that define details of the type of the data value,
   the converting unit also converts a type attribution so that the type attributions in the search conditions for the physical model and the logical model match when data types do not match between corresponding data items; and
   the outputting unit also converts a type attribution so that the type attributions in the physical-model-compliant data and the logical-model-compliant data match when data type is matched and type attributions are not matched between corresponding data items.

4. The data integration apparatus according to claim 1,
wherein when the utilization-side application requires that information from the information sources be joined,
a data item having the primary key constraint in each of physical models is linked to a data item having the primary key constraint in the logical model based on the mapping definition,
the converting unit converts a search condition for the logical model into search conditions for the physical models,
the collecting unit issues the search conditions for the physical models to the information sources and collects physical-model-compliant data items matching the search conditions for the physical models, and
the outputting unit converts the physical-model-compliant data items into a logical-model-compliant data based on the meta information.

5. The data integration apparatus according to claim 1, wherein
the storing unit stores an intermediate table that is used for conversion between the physical model and the logical model,
the mapping definition links a data item in the physical model to a data item having a primary key constraint in the intermediate table and links a data item in logical-model-compliant data converted by the intermediate table to a data item in the logical model,
the converting unit converts the search condition for the logical model into the search condition for the physical model based on the intermediate table, and
the outputting unit converts the physical-model-compliant data based on the intermediate table and links the converted data to the logical model.

6. The data integration apparatus according to claim 1, wherein
the physical model is defined as a data model excluding a data item that is not shared with other systems,
the logical model is defined as a data model that is associated with, based on the mapping definition, a data item of the physical model that is used by the utilization-side application, and
the utilization-side application searches a logical model into which data of the information sources registered as the physical model have been integrated.

7. The data integration apparatus according to claim 6, wherein
when format of the information resources registered as the physical model is changed, the physical model is re-defined to reflect the change of the format into the data integration apparatus.

8. The data integration apparatus according to claim 6, wherein
when format of data required by the utilization-side application is changed, the logical model corresponding to the required data is modified to reflect the change of the format into the data integration apparatus.

9. A data integration method of collecting and integrating data in a plurality of information sources, comprising:
storing a physical model, which is a data model corresponding to each information source and includes data items and a primary key constraint for a data item that servers as a primary key,
storing a logical model, which is a data model defined for a utilization-side application utilizing integrated data and includes data items and a primary key constraint for a data item that serves as a primary key; and
storing a mapping definition that defines a correspondence relation between a data item of the physical model and a data item of the logical model as correspondence relation between a FROM column and a TO column;
receiving a search condition for the logical model from the utilization-side application;
converting the search condition for the logical model into a search condition for the physical model based on the meta information issuing the search condition for the physical model to an information source;
collecting from the information source physical-model-compliant data matching the search condition for the physical model;
converting, based on the meta information, the collected physical-model-compliant data into logical-model-compliant data; and
outputting the logical-model-compliant data to the utilization-side application.

10. A computer-readable, non-transitory medium storing a program for collecting and integrating data in a plurality of information sources managed in different systems, the program causing a computer to perform:
storing meta information that includes a physical model, which is a data model corresponding to each information source and includes data items and a primary key constraint for a data item that serves as a primary key,
a logical model, which is a data model defined for a utilization-side application utilizing integrated data and includes data items and primary key constraint for a data item that serves as a primary key, and
a mapping definition that defines a correspondence relation between a data item of the physical model and a data item of the logical model as a correspondence relation between a FROM column and a TO column;
receiving a search condition for the logical model from the utilization-side application;
converting the search condition for the logical model into a search condition for the physical model based on the meta information issuing the search condition for the physical model to an information source;
collecting from the information source physical-model-compliant data matching the search condition for the physical model;
converting, based on the meta information, the collected physical-model-compliant data into logical-model-compliant data; and
outputting the logical-model-compliant data to the utilization-side application.

* * * * *